(12) United States Patent
Yeon et al.

(10) Patent No.: US 10,187,338 B2
(45) Date of Patent: Jan. 22, 2019

(54) METHOD FOR CONTROLLING DATA AND ELECTRONIC DEVICE THEREOF

(71) Applicant: Samsung Electronics Co., Ltd., Gyeonggi-do (KR)

(72) Inventors: Ji-Hyun Yeon, Gyeonggi-do (KR); Geon-Soo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 465 days.

(21) Appl. No.: 14/583,090

(22) Filed: Dec. 24, 2014

(65) Prior Publication Data

US 2015/0188863 A1 Jul. 2, 2015

(30) Foreign Application Priority Data

Dec. 27, 2013 (KR) ........................ 10-2013-0166116

(51) Int. Cl.
*G06F 15/16* (2006.01)
*H04L 12/58* (2006.01)
*H04L 29/08* (2006.01)

(52) U.S. Cl.
CPC .............. *H04L 51/08* (2013.01); *H04L 67/06* (2013.01); *H04L 29/08117* (2013.01); *H04L 51/04* (2013.01); *H04L 51/10* (2013.01); *H04L 51/20* (2013.01)

(58) Field of Classification Search
CPC ... H04L 51/08; H04L 67/06; H04L 29/08117; H04L 12/581; H04L 12/5865
See application file for complete search history.

(56) References Cited

U.S. PATENT DOCUMENTS

| | | | |
|---|---|---|---|
| 6,687,741 B1 * | 2/2004 | Ramaley .............. | G06Q 10/107 709/206 |
| 7,912,908 B2 | 3/2011 | Cai et al. | |
| 8,204,483 B2 * | 6/2012 | Bumiller ............... | G06Q 10/00 455/412.1 |
| 8,239,853 B2 | 8/2012 | Lee | |

(Continued)

FOREIGN PATENT DOCUMENTS

| KR | 20060091539 A | 8/2006 |
|---|---|---|
| KR | 10-2009-0001901 | 1/2009 |

(Continued)

OTHER PUBLICATIONS

International Search Report dated Mar. 31, 2015 in connection with International Application No. PCT/KR2014/012867; 3 pages.

(Continued)

*Primary Examiner* — Krisna Lim

(57) ABSTRACT

A method for controlling an application using an electronic device is provided. The method includes providing a message application through the electronic device. The method also includes acquiring a message list comprising information about one or more messages transmitted or received by the electronic device, based on an input configured to transmit a file to an external device for the electronic device through the message application. The method further includes attaching to the message application at least a part of message information about the at least one message as the file, based on an input of selecting at least one message among the message list.

19 Claims, 18 Drawing Sheets

(56) References Cited

U.S. PATENT DOCUMENTS

| | | | |
|---|---|---|---|
| 2006/0031309 A1* | 2/2006 | Luoffo | G06Q 10/107 709/206 |
| 2008/0172663 A1 | 7/2008 | Lee | |
| 2008/0256199 A1 | 10/2008 | Pesala | |
| 2009/0198782 A1* | 8/2009 | Chang | G06Q 10/107 709/206 |
| 2011/0078263 A1* | 3/2011 | Watanabe | G06Q 10/107 709/206 |
| 2012/0278405 A1* | 11/2012 | Costenaro | H04L 51/08 709/206 |
| 2012/0278406 A1* | 11/2012 | Meisels | H04L 51/08 709/206 |
| 2013/0073640 A1* | 3/2013 | Liao | H04L 51/08 709/206 |
| 2013/0132492 A1* | 5/2013 | Tsuruta | H04L 51/08 709/206 |
| 2013/0346510 A1 | 12/2013 | Mohit et al. | |
| 2014/0006532 A1* | 1/2014 | Yanagi | G06F 3/1204 709/206 |
| 2014/0013246 A1* | 1/2014 | Beechuk | H04L 65/403 715/753 |
| 2014/0136599 A1* | 5/2014 | Shiue | H04L 67/1095 709/203 |
| 2014/0181223 A1* | 6/2014 | Homsany | H04L 51/08 709/206 |
| 2014/0189021 A1* | 7/2014 | Kadashevich | H04L 51/08 709/206 |
| 2014/0297759 A1* | 10/2014 | Mody | H04L 51/08 709/206 |
| 2014/0359028 A1* | 12/2014 | Cudak | H04L 51/063 709/206 |
| 2015/0134751 A1* | 5/2015 | Meyers, Jr. | H04L 51/08 709/206 |
| 2015/0200885 A1* | 7/2015 | Sharp | H04L 51/08 709/206 |

FOREIGN PATENT DOCUMENTS

| | | |
|---|---|---|
| KR | 10-2009-0003247 | 1/2009 |
| KR | 20130082037 A | 7/2013 |

OTHER PUBLICATIONS

Written Opinion of International Searching Authority dated Mar. 31, 2015 i in connection with International Application No. PCT/KR2014/012867; 5 pages.

Supplementary European Search Report dated Jun. 30, 2017 in connection with European Patent Application No. EP 14 87 3425.

Communication from a foreign patent office in a counterpart foreign application, European Patent Office, Communication pursuant to Article 94(3) EPC, Application No. 14873425.4, dated Sep. 19, 2018, 5 pages.

* cited by examiner

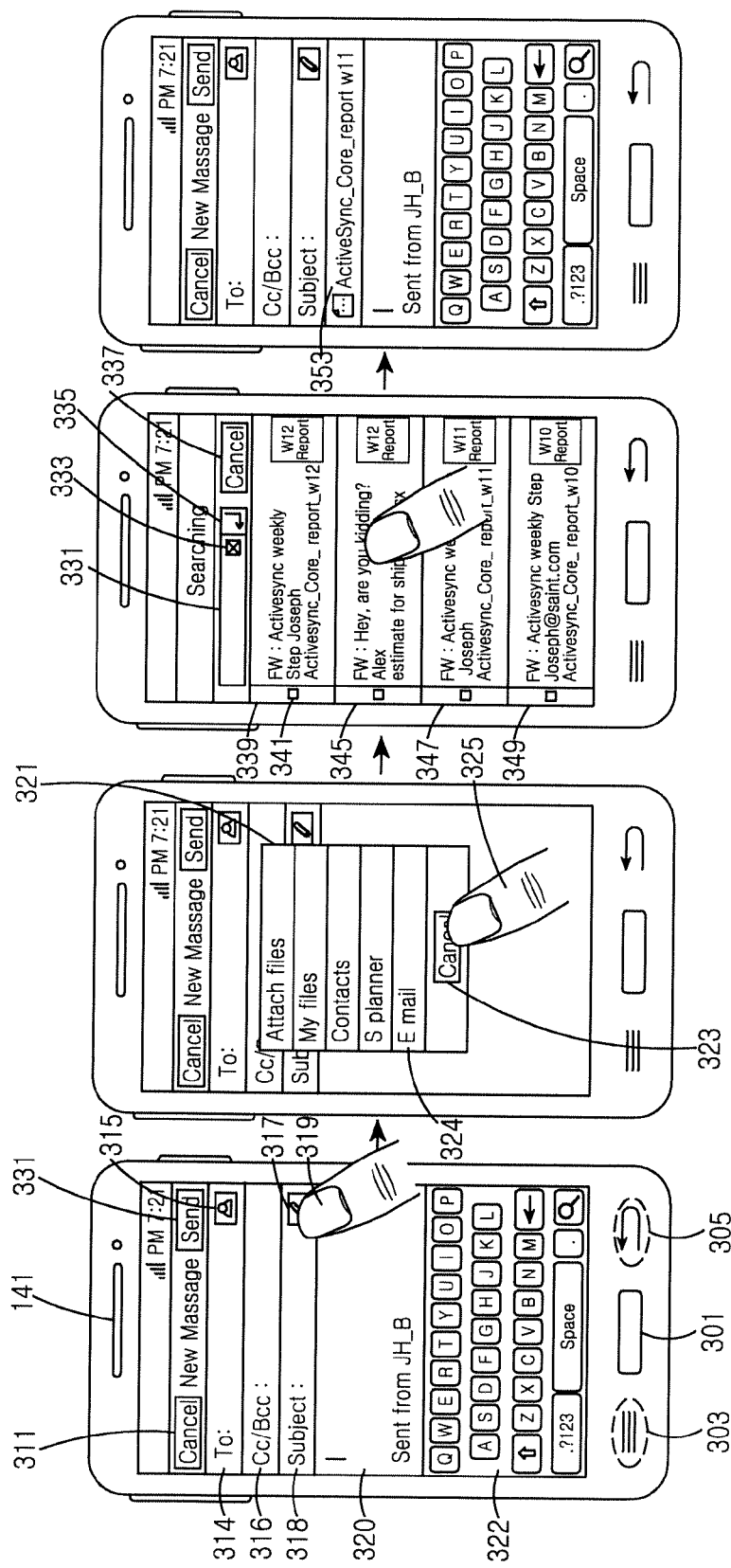

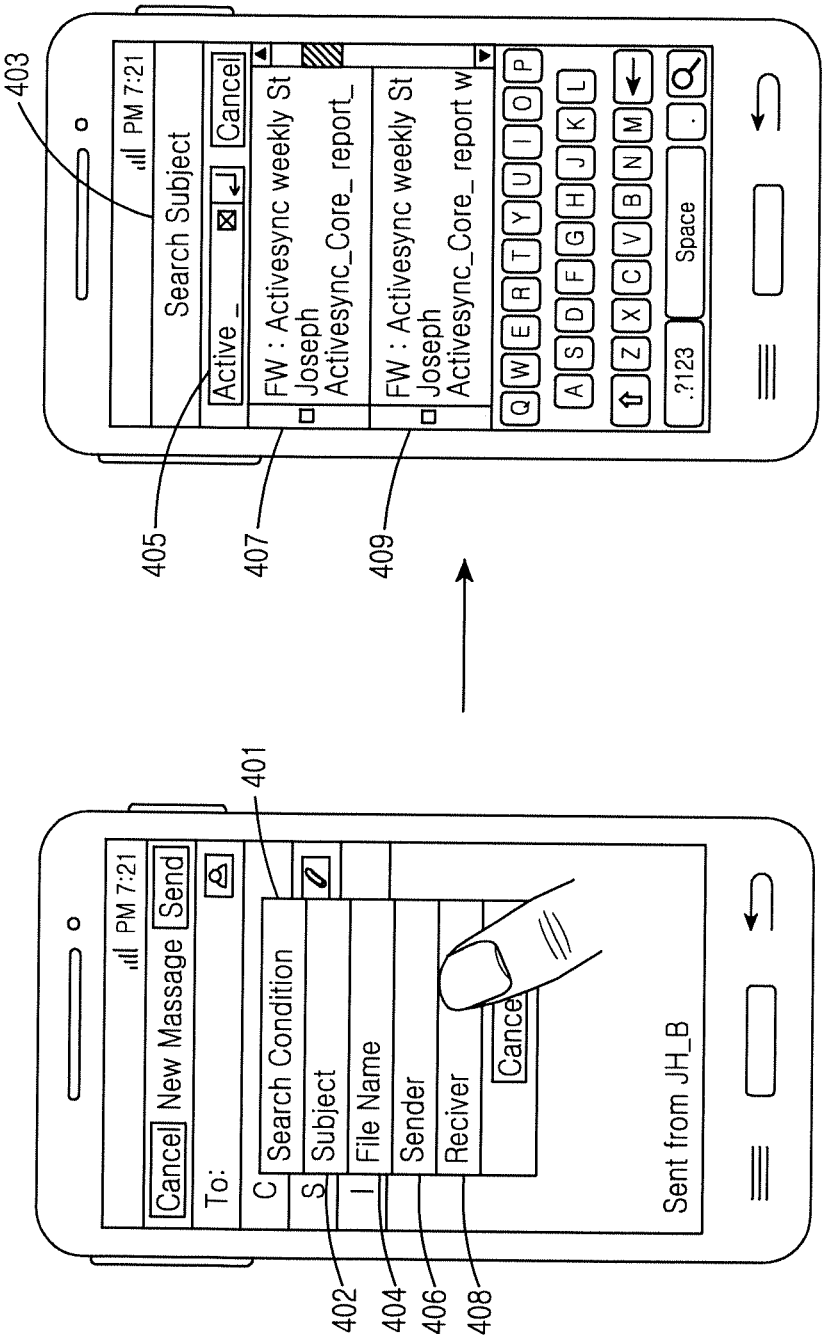

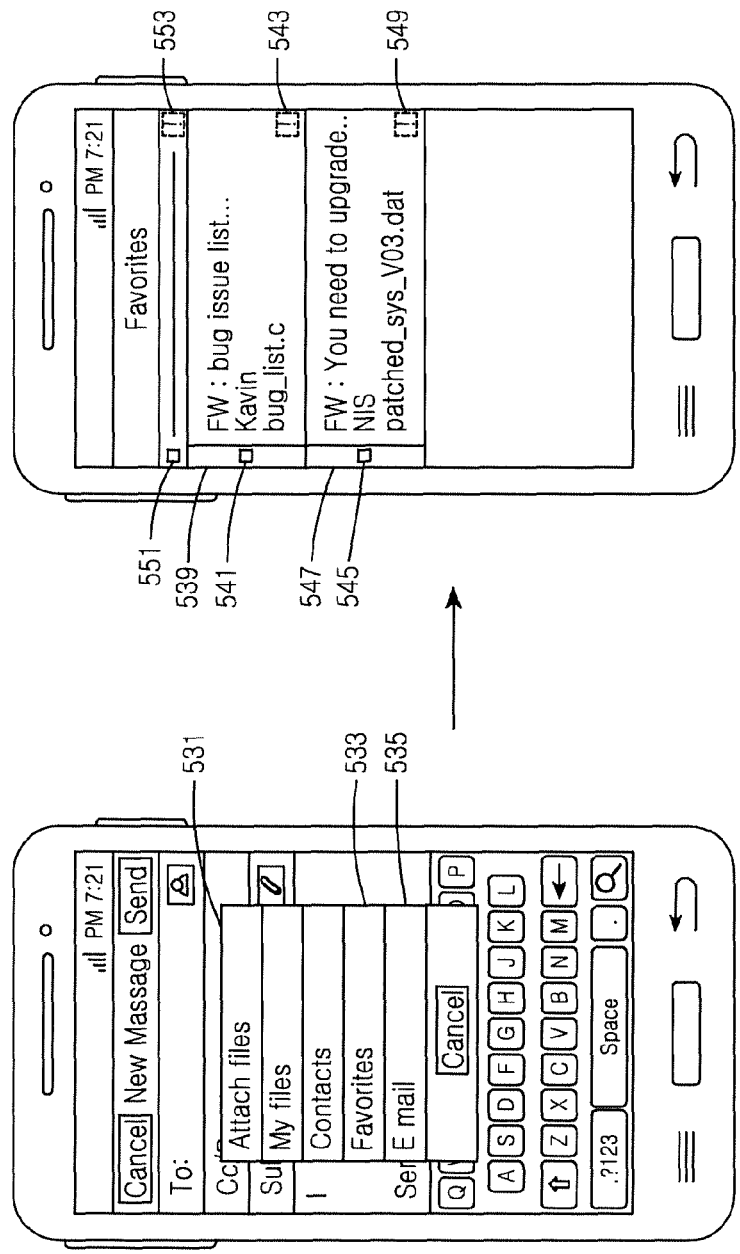

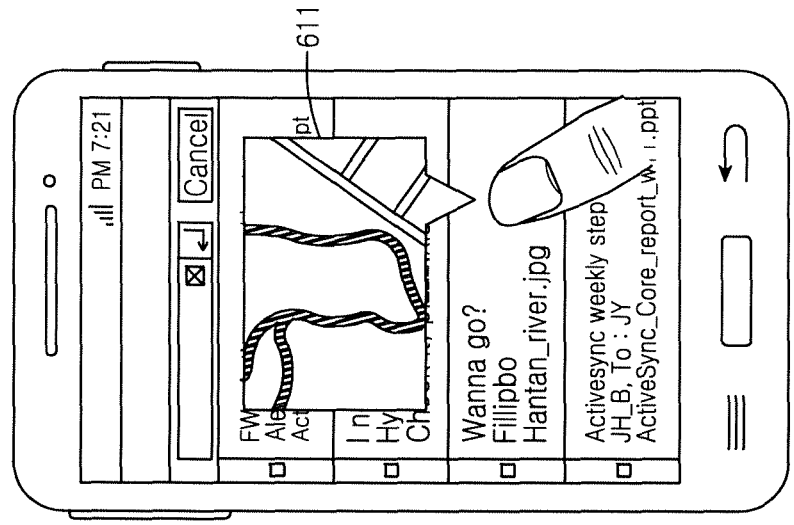
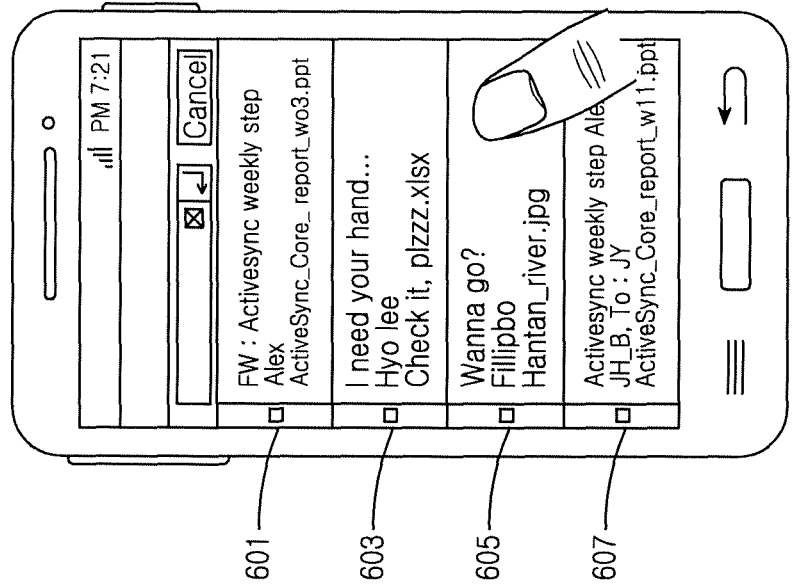
FIG.6A

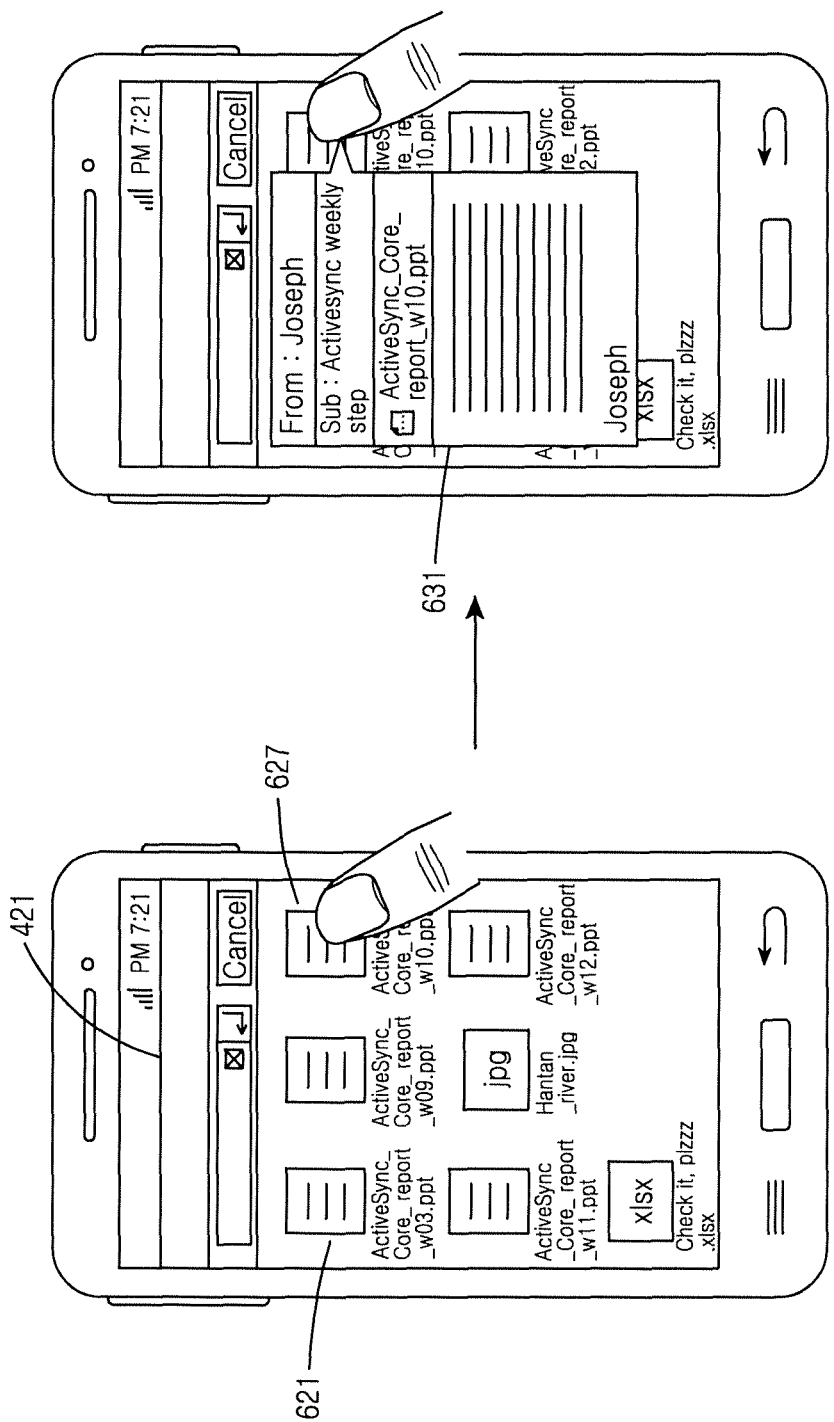

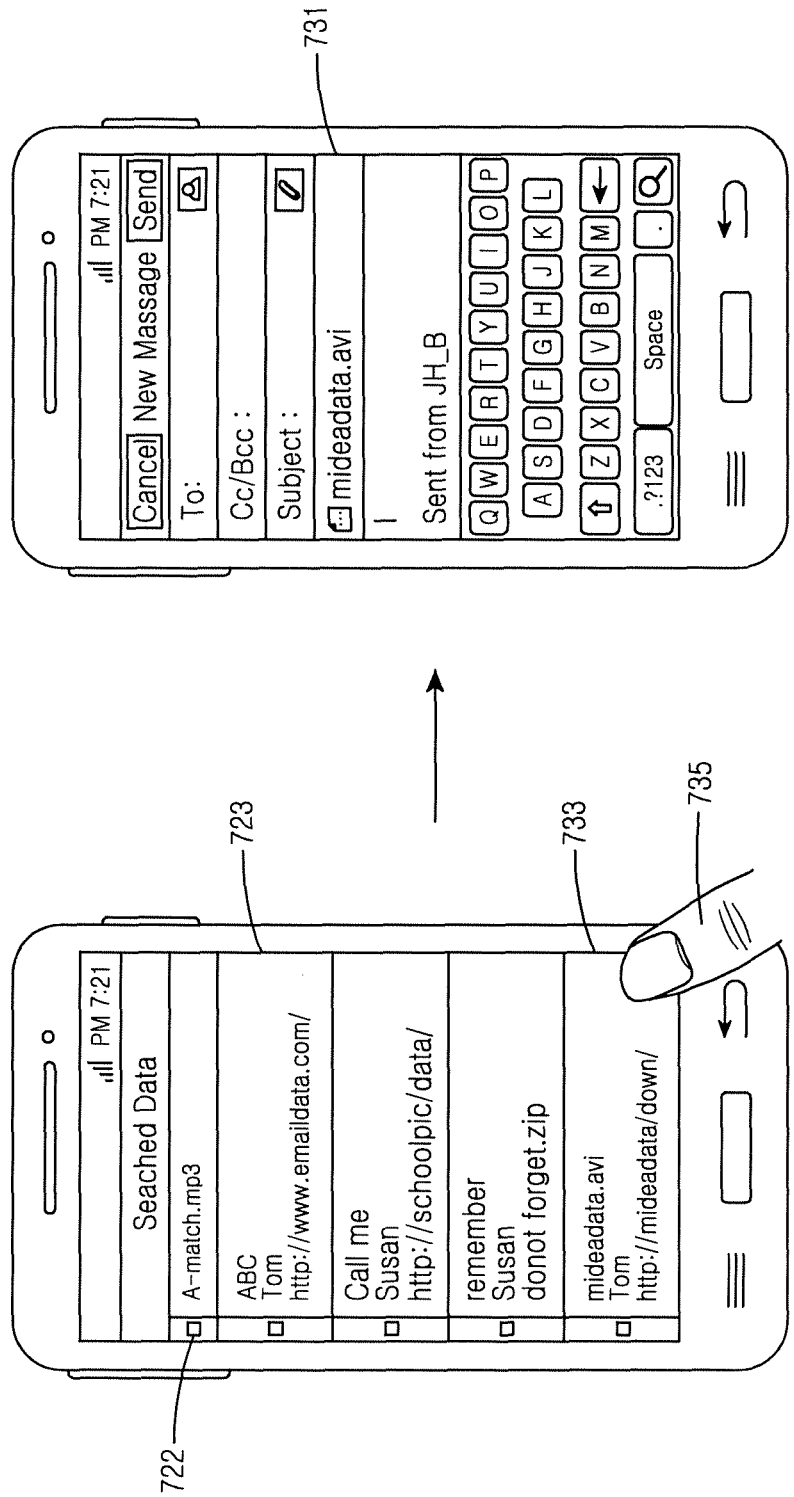

METHOD FOR CONTROLLING DATA AND ELECTRONIC DEVICE THEREOF

PRIORITY

The present application is related to and claims priority under 35 U.S.C. § 119(a) to an application No. 10-2013-0166116 filed in the Korean Intellectual Property Office on Dec. 27, 2013 the contents of which are incorporated herein by reference.

TECHNICAL FIELD

The present disclosure relates to an electronic device. According to various exemplary embodiments, the present disclosure relates to a method for controlling data and an electronic device thereof.

BACKGROUND

In a case where an electronic device transmits an electronic mail (Email) or message, when attaching and transmitting data or information, the electronic device has to confirm the data or information intended to be attached. For the sake of such confirmation, there is a need for tracing the data or information through several steps.

SUMMARY

To address the above-discussed deficiencies, it is a primary object to provide a method for managing data that an electronic device transmits or receives with another electronic device and the electronic device thereof.

Various exemplary embodiments of the present disclosure can provide a method for providing information included in a database of an electronic device in a data transmission or reception means and the electronic device thereof.

Various exemplary embodiments of the present disclosure can provide a method for connecting data included in an electronic device and a program of the electronic device and the electronic device thereof.

In a first embodiment, a method for controlling an application using an electronic device is provided. The method includes providing a message application through the electronic device. The method also includes acquiring a message list comprising information about one or more messages transmitted or received by the electronic device, based on an input for transmitting a file to an external device for the electronic device through the message application. The method further includes attaching to the message application at least a part of message information about the at least one message as the file, based on an input of selecting at least one message among the message list.

In a second embodiment, an electronic device is provided. The electronic device includes a touch screen configured to display at least one message. The electronic device also includes a processor configured to control the touch screen. The processor is configured to provide a message application through the electronic device. The processor is also configured to acquire a message list comprising information about one or more messages transmitted or received by the electronic device, based on an input for transmitting a file to an external device for the electronic device through the message application. The processor is further configured to attach to the message application at least a part of message information about the at least one message as the file, based on an input of selecting at least one message among the message list.

In a third embodiment, a computer-readable recording medium storing a program for executing a method for controlling an application using an electronic device is provided. The method includes providing a message application through the electronic device. The method also includes acquiring a message list comprising information about one or more messages transmitted or received by the electronic device, based on an input for transmitting a file to an external device for the electronic device through the message application. The method further includes attaching to the message application at least a part of message information about the at least one message as the file, based on an input of selecting at least one message among the message list.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A, 3B, 3C and 3D are diagram illustrating an example operation of displaying attachment data in an electronic device according to this disclosure;

FIGS. 4A, 4B, 4C, 4D, and 4E are diagrams illustrating example operations of displaying information associated with attachment data in an electronic device according to this disclosure;

FIGS. 5A, 5B, and 5C are diagrams illustrating example operations of extending information of an Email in an electronic device according to this disclosure;

FIGS. 6A, 6B, and 6C are diagrams illustrating example operations of displaying attachment data in an electronic device according to this disclosure;

FIGS. 7A, 7B, 7C, 7D, 7E, 7F, 7G, and 7H are diagrams illustrating example operations of re-attaching attached data in an electronic device according to this disclosure;

DETAILED DESCRIPTION

Figure 1:
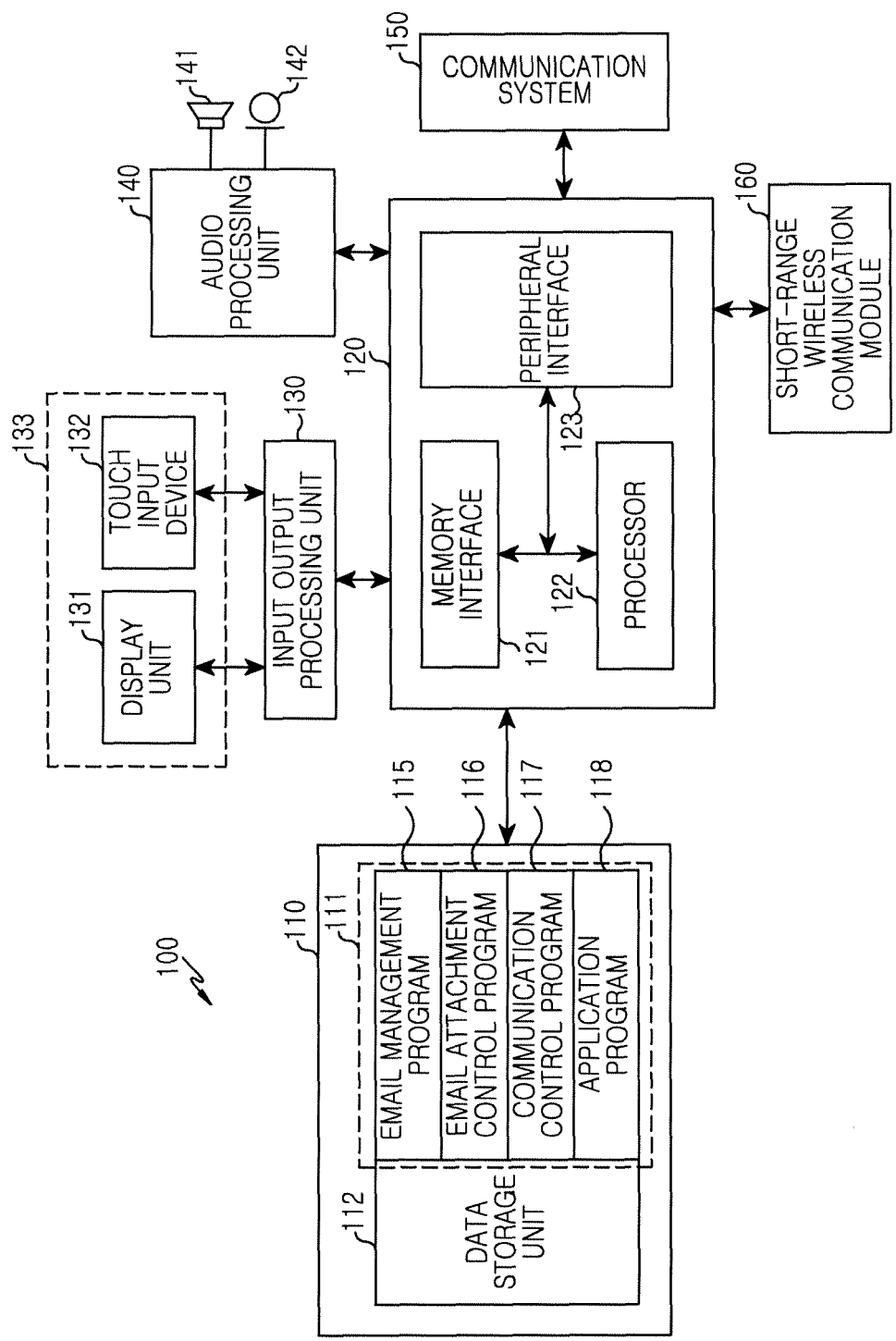
FIG. 1 is a block diagram illustrating a construction of an example electronic device according to this disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present disclosure will be described herein below with reference to the accompanying drawings. In describing the present disclosure, well-known functions or constructions are not described in detail since they would obscure the disclosure in unnecessary detail. And, terms described below, which are defined considering functions in the present disclosure, is modified in accordance to user and operator's intention or practice. Therefore, the definition should be given on the basis of the content throughout the present specification.

In describing various exemplary embodiments of the present disclosure, an electronic device is described on a basis of a touch screen capable of conducting in a physical one screen an input operation through an input device and a display operation through a display unit. Although the display unit and the input device are separately illustrated in a device construction of the present disclosure, the display unit is illustrated to include the input device or be illustrated as the input device.

The present disclosure is not limited only to an electronic device including a touch screen, and would be applicable to various electronic devices physically dividing a display unit and an input device or including only one of the display unit and the input device. In various exemplary embodiments below, a device displaying with the touch screen represent an electronic device which includes a touch screen including a touch input device and a display unit, a display unit not including a touch input device, or a display unit including an input device.

In the following description, an electronic device 100 includes a mobile communication user device, a Personal Digital Assistant (PDA), a Personal Computer (PC), a laptop, a smart phone, a smart Television (TV), a netbook, a Mobile Internet Device (MID), an Ultra Mobile PC (UMPC), a tablet PC, a mobile pad, a media player, a handheld computer, a navigator, a smart watch, a Head-Mounted Device (HMD), and an MPEG Audio Layer 3 Player (MP3P).

In a detailed description of the present disclosure below, when it is mentioned that any constituent element is 'connected' or 'accessed' to another constituent element, the any constituent element is directly connected or accessed to the other constituent element, but it should be understood that the third constituent element can exist between the two constituent elements. In contrast, when it is mentioned that any constituent element is 'directly connected' or 'directly accessed' to another constituent element, it should be understood that the third constituent element does not exist between the two constituent elements.

FIG. 1 is a block diagram illustrating a construction of an example electronic device according to this disclosure.

As illustrated in FIG. 1, the electronic device 100 includes a memory 110 and a processor unit 120, and includes peripheral devices such as an input output processing unit 130, a display unit 131, a touch input device 132, an audio processing unit 140, a communication system 150, and other peripheral devices.

The memory 110 includes a program storage unit 111 storing a program for controlling an operation of the electronic device 100, and a data storage unit 112 storing data generated during program execution. The memory 110 stores data and the like generated in the program by an operation of the processor 122. According to one exemplary embodiment, the data storage unit 112 previously defines operation information for the electronic device 100 to control another electronic device and construct and store a database of a table or list form.

According to one exemplary embodiment, the data storage unit 112 stores message (such as Email) information transmitted/received between the electronic device 100 and another electronic device, information about a message, and information about attachment data included in a transmitted/received message, in accordance to a predefined standard. According to one exemplary embodiment, the electronic device 100 stores the stored information in a database which is constructed by classifying into a category such as a message subject, a sender of a received message, a receiver of a transmitted message, a history of a transmitted/received message, a data name attached to a message, link information included in a message, and a data form attached to a message.

The program storage unit 111 includes an Email management program 115, an Email attachment control program 116, a communication control program 117, and at least one application program. The programs (such as program modules or modules) included in the program storage unit 111 is constructed as a set of instructions and be expressed as an instruction set. The application program 118 includes a software constituent element for at least one application program installed in the memory 110 of the electronic device 100.

The Email management program 115 transmit or receive data with another electronic device in an Email transmission or reception method. According to one exemplary embodiment, the electronic device 100 transmit or receive a message with another electronic device through a server taking charge of Email transmission or reception, and attach and transmit or receive data to the message. According to one exemplary embodiment, the Email management program 115 of the electronic device 100 controls to perform a role of a server device taking charge of Email transmission or reception with another electronic device, and controls to store in the data storage unit 112 Email data transmitted or received with another electronic device or attachment data included in the Email data. According to one exemplary embodiment, the Email management program 115 acquires various information based on transmitted or received Email data or attachment data, and constructs the database in accordance to a form or classification of information.

When attaching data to an Email transmitted by the Email management program 115 of the electronic device 100, the Email attachment control program 116 provides information about an Email or attachment data stored in the database. According to one exemplary embodiment, the Email attachment control program 116 provides the Email or attachment data stored in the database, in accordance to the classified categories, and searches the attachment data stored in the database, in accordance to an inputted search condition. According to one exemplary embodiment, the electronic device 100 provides to select one or more attachment data based on information about a transmitted or received Email or attachment data included in the Email, without requiring location information of data commonly required to attach data to a transmitted Email.

The communication control program 117 includes at least one software constituent element for controlling communication with at least one another electronic device using the communication system 150 or a short-range wireless communication module 160. According to one exemplary embodiment, the communication control program 117 searches another electronic device for connecting communication. If another electronic device for communication connection is searched, the communication control program 117 establishes connection for communication with the other electronic device. Also, the communication control program 117 controls to perform a performance search and session establishment procedure with the connected another electronic device and transmit or receive data (such as packet data) with the other electronic device through the communication system 150.

The memory 110 included in the electronic device 100 is constructed as one or more. According to one exemplary embodiment, the memory 110 performs a function of only the program storage unit 111, or performs a function of only the data storage unit 112, or performs the functions of all of them, in accordance to a use. Because of a characteristic of the electronic device 100, the memory 110 may not be constructed to make clear physical region division within the memory 110.

The processor unit 120 includes a memory interface 121, at least one processor 122, and a peripheral interface 123. Here, the memory interface 121, the at least one processor 122, and the peripheral interface 123, which are included in the processor unit 120, is integrated as at least one circuit or be implemented as separate constituent elements.

The memory interface 121 controls a constituent element such as the processor 122 or the peripheral interface 123 to gain access to the memory 110.

The peripheral interface 123 controls the connection of the memory interface 121 and the processor 122 with an input output peripheral device of the electronic device 100.

The processor 122 controls the electronic device 100 to provide various multimedia services using at least one software program, and display to confirm a User Interface (UI) operation of the electronic device 100 by the display unit 131 through the input output processing unit 130, and control the touch input device 132 to provide a service of receiving an instruction from the external of the electronic device 100. The processor 122 controls to execute at least one program stored in the memory 110 and provides a service corresponding to the corresponding program.

The input output processing unit 130 provides an interface between the peripheral interface 123 and the input output device 133 such as the display unit 131 and the touch input device 132.

The display unit 131 receives status information of the electronic device 100, characters inputted from the external, and a picture image of a moving-picture image or a still-picture image from the processor unit 120, and constructs a UI operation, and displays the UI operation through the input output processing unit 130.

The touch input device 132 provides input data generated by user's selection, to the processor unit 120 through the input output processing unit 130. According to one exemplary embodiment, the touch input device 132 is comprised of only a control button or be comprised of a keypad so as to receive data for control from the external of the electronic device 100.

According to one exemplary embodiment, the touch input device 132 is provided together with the display unit 131 as the input output device 133 such that input and output is operated in one screen. In this case, the touch input device 132 used in the input output device 133 uses one or more methods among a capacitive overlay method, a resistance overlay (such as a pressure sensitive) method, an infrared beam method, an electronic inductive method, and an ultrasonic method.

According to one exemplary embodiment, the input method of the touch input device 132 is a method of processing to input an instruction if an input means is positioned within a certain distance from the touch screen 133 in addition to a method of directly touching and inputting to the touch screen 133, and uses the terms of a hovering touch, a floating touch, an indirect touch, a proximity touch, and a non-contact input.

The input output device 133, a device physically combining the touch input device 132 to one screen on the display unit 131, is a touch screen capable of inputting an instruction by touching a screen construction displayed on the display unit 131 in an operation of the electronic device 100. The touch screen performs all of roles of the display unit 131 displaying a UI operation of the electronic device 100 and the touch input device 132 inputting an external instruction to the electronic device 100 and therefore, in the following description, the touch screen 133 is constructed including the display unit 131 and the touch input device 132. In the present disclosure, the touch screen 133 comprised of a complex touch panel in which a touch panel and a pen touch panel are implemented together is illustrated and, on a basis of this, a description is made. The touch screen 133 of the electronic device 100 is applied even to a touch screen applying a pen touch panel making possible only pen touch, without being limited to the touch screen comprised of the complex touch panel.

The audio processing unit 140 provides an audio interface between a user and the electronic device 100 through a speaker 141 and a microphone 142.

The communication system 150 performs a telecommunication function. According to one exemplary embodiment, the communication system 150 performs communication with another electronic device using one or more of mobile communication through a base station, wired communication, and artificial satellite communication, and performs short-range wireless communication by connecting with the short-range wireless communication module 160.

According to one exemplary embodiment, the short-range wireless communication module 160 performs communication with another electronic device using at least any one of Infrared Data Association (IrDA) communication, Bluetooth (BT) communication, Bluetooth Low Energy (BLE) communication, Wireless-Fidelity (Wi-Fi) communication, Near Field Communication (NFC), Zigbee communication, short-range wireless communication such as Ultra WideBand (UWB) communication, Wireless Local Area Network (WLAN) communication, and wired communication. According to one exemplary embodiment, the communication system 150 and the short-range wireless communication module 160 are distinguished and described, but the communication system 150 and the short-range wireless communication module 160 also performs communication in one communication system module. In describing various exemplary embodiments of the present disclosure, an IrDA communication module and a short-range wireless communication module is distinguished and described.

Although not illustrated, one or more programs or one or more constituent elements of the electronic device 100 also performs an operation by one or more control modules controlled by the processor 122.

In describing an exemplary embodiment of the present disclosure, displaying in the electronic device 100 or outputting in the electronic device 100 is the teams representing a method of displaying a moving picture, a still picture, or a Graphic User Interface (GUI) operation on the touch screen 133 of the electronic device 100 or outputting a signal sound or voice audio to the speaker 141. Even in the following description, the term of displaying or outputting is used as the similar meaning, and is described separately if division is needed. Also, in the following description, one exemplary embodiment for an operation of displaying on a display device of the electronic device 100 and receiving an input by an input device is described as inputting or outputting through the touch screen 133, but it is obvious that the touch screen 133 is applied even to an exemplary embodiment through various input output devices in which a display device and an input device is separated (such as the display device and a key pad device) in addition to an input output device such as a touch screen in which an input device (such as the touch input device 132) and an output device (such as the display unit 131) are constructed like one part as one exemplary embodiment.

In describing various exemplary embodiments of the present disclosure, as one exemplary embodiment of a data transmission or reception function capable of including attachment data, an Email function is described. However, it is obvious that various exemplary embodiments are not limited to the Email function, and is applied to various electronic mails (such as an Email, a text message, an interactive text message, a social network service, and a message transmission or reception service storing a transmission or reception message in a server or the like) capable of transmitting or receiving a message including attachment data between the electronic device 100 and one or more second electronic devices.

In describing various exemplary embodiments of the present disclosure, the electronic device 100 performs roles of one or more another electronic devices (such as a first electronic device, a second electronic device, or a third electronic device or the like). According to various exemplary embodiments, one or more another electronic devices (such as the first electronic device, the second electronic device, or the third electronic device and the like) is the same or similar to the electronic device 100 or include a part of the electronic device 100.

Figure 2:
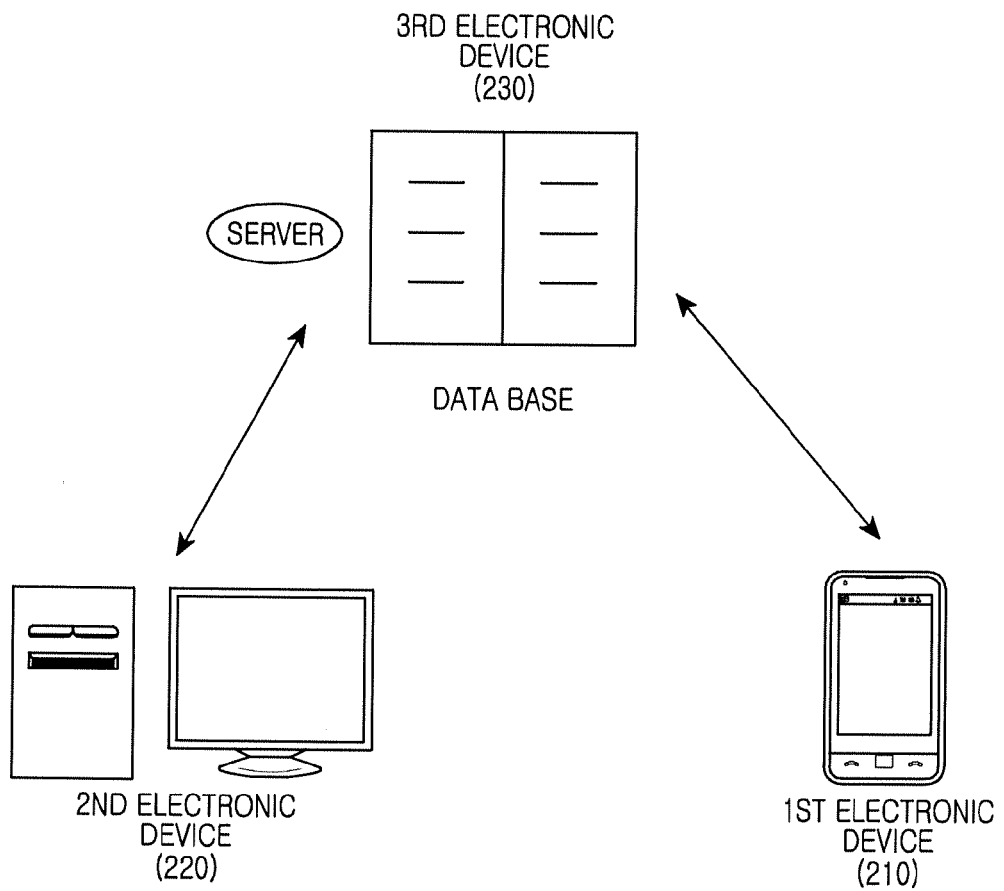
FIG. 2 is a diagram illustrating an example operation of transmitting or receiving data in an electronic device according to this disclosure.

FIG. 2 illustrates an example operation of transmitting or receiving data in an electronic device according to this disclosure.

According to various exemplary embodiments, a first electronic device 210 transmits or receives data with a second electronic device 220. According to one exemplary embodiment, the first electronic device 210 is a mobile electronic device (such as a smart phone). The first electronic device 210 transmits or receives data with the second electronic device 220 in an Email method. According to one exemplary embodiment, the first electronic device 210 receives an Email including attachment data from the second electronic device 220. According to one exemplary embodiment, the first electronic device 210 includes attachment data in an Email and transmits the Email to the second electronic device 220. According to one exemplary embodiment, the first electronic device 210 attaches to a new Email attachment data attached to a received Email and transmit the new Email to the second electronic device 220. According to one exemplary embodiment, the first electronic device 210 receives an Email from the second electronic device 220 through a third electronic device 230. According to one exemplary embodiment, the first electronic device 210 transmits an Email to the second electronic device 220 through the third electronic device 230.

According to various exemplary embodiments, the second electronic device 220 transmits or receives data with the first electronic device 210. According to one exemplary embodiment, the second electronic device 220 is a non-mobile device (such as a desktop Personal Computer (PC)). The second electronic device 220 transmits or receives data with the first electronic device 210 in an Email method. According to one exemplary embodiment, the second electronic device 220 receives an Email including attachment data from the first electronic device 210. According to one exemplary embodiment, the second electronic device 220 includes attachment data in an Email and transmits the Email to the first electronic device 210. According to one exemplary embodiment, the second electronic device 220 attaches to a new Email attachment data attached to a received Email and transmit the new Email to the first electronic device 210. According to one exemplary embodiment, the second electronic device 220 receives an Email from the first electronic device 210 through the third electronic device 230. According to one exemplary embodiment, the second electronic device 220 transmits an Email to the first electronic device 210 through the third electronic device 230.

According to various exemplary embodiments, the third electronic device 230 relays transmitted or received data to the first electronic device 210 and the second electronic device 220. According to one exemplary embodiment, the third electronic device 230 is a server device (such as an Email server). The third electronic device 230 relay transmitted or received Email data between the first electronic device 210 and the second electronic device 220, and stores the transmitted or received data. According to one exemplary embodiment, the third electronic device 230 stores attachment data included in Email data that the first electronic device 210 transmits to the second electronic device 220. According to one exemplary embodiment, if the third electronic device 230 stores data transmitted by the first electronic device 210, the third electronic device 230 replaces the stored data with link information connectable with the stored data and transmits the link information to the second electronic device 220. If the second electronic device 220 includes link information of received attachment data in an Email and transmits the Email to the first electronic device 210, the third electronic device 230 downloads (or stores) data linked with the link information attached by the second electronic device.

According to various exemplary embodiments, the electronic device 100 performs one or more functions of the first electronic device 210, the second electronic device 220, and the third electronic device 230. According to one exemplary embodiment, the electronic device 100 is a mobile electronic device like the first electronic device 210, and is a non-mobile electronic device like the second electronic device 220. According to one exemplary embodiment, the electronic device 100 also performs a function of relaying data transmission or reception between different two devices like the third electronic device 230. According to one exemplary embodiment, the electronic device 100 stores attachment data included in an Email transmitted or received with another electronic device. The first electronic device 210, the second electronic device 220, or the third electronic device 230 is referred as each exemplary embodiment describing a role of the electronic device 100 or a function thereof.

FIGS. 3A, 3B, 3C and 3D illustrate an example operation of displaying attachment data in an electronic device according to this disclosure.

The electronic device 100 displays attachment data associated with an Email that is being written, with reference to information of a transmitted or received Email of a database stored in the memory 110 and information of the attachment data attached to the transmitted or received Email.

Referring to FIG. 3A, according to one exemplary embodiment, the electronic device 100 includes a speaker 141 capable of expressing sound in an upper position of the electronic device 100, and includes a button 301 being one of input devices capable of inputting an instruction by click at a lower side of the electronic device 100, and includes a touch button 303 or 305 capable of inputting an instruction through a touch in a fixed position of the electronic device 100. Although the speaker 141, the button 301 or the touch button 303 or 305 is not illustrated, the electronic device 100 includes the speaker 141, the button 301, or the touch button 303 or 305 in the same position or a different position.

According to various exemplary embodiments, the electronic device 100 displays on the touch screen 133 an Email writing region capable of writing an Email through the Email management program 115. According to one exemplary embodiment, the Email writing region includes and displays one or more of an Email writing cancel icon 311, a written Email send icon 313, a receiver region 314, a carbon copy or blind carbon copy region 316, an Email subject region 318, a text region 320, and a virtual keypad region 322 capable of inputting characters. According to one exemplary embodiment, the receiver region 314 of the Email writing region of the electronic device 100 directly inputs an address of a receiver, or displays an address book icon 315 provided to display a previously stored list of receivers such that a user selects a previously stored address of a receiver. According to one exemplary embodiment, the Email writing region of the electronic device 100 displays a data attachment icon 317 in a certain region of the Email writing region such that the user attaches one or more data confirmable in the electronic device 100.

If the user selects (319) the data attachment icon 317 in the Email writing region, the electronic device 100 displays in various methods data confirmable in the electronic device 100.

Referring to FIG. 3B, the electronic device 100 displays in various methods data attachable to an Email with reference to the database of the memory 100.

According to various exemplary embodiments, if sensing a motion of selecting (319) the data attachment icon 317, the electronic device 100 displays a provision program list 321 capable of selecting data included in the electronic device 100 in a predefined category classified in accordance to a provided program. A method of displaying the data included in the electronic device 100 in accordance to the predefined category is not limited to a method of displaying by a list, and is a method of displaying by an icon or emoticon or is a method of outputting by a voice through the speaker 141.

According to various exemplary embodiments, the electronic device 100 select data among data attached to previously transmitted or received one or more Emails and re-attach the selected data to an Email. Through the displayed provision program list 321, the electronic device 100 selects (325) an item 'Email' 324 that the Email attachment control program 116 provides such that the electronic device 100 displays selectable one or more data. According to one exemplary embodiment, the electronic device 100 displays a cancel icon 323 capable of releasing the display of the displayed provision program list 321 in a certain region of the displayed provision program list 321.

Referring to FIG. 3C, if selecting the item 'Email' in the displayed provision program list 321, the electronic device 100 decides whether attachment data exists, with reference to information about Emails transmitted or received in the electronic device 100 through an Email database or information about Emails transmitted or received through predefined one or more Email accounts, and displays on the touch screen 133 information about an Email having attachment data or attachment data included in the Email. The aforementioned information displayed on the touch screen 133 is information searched in a database of the electronic device 100, and is information searched in a database of another electronic device (such as a server device) by requesting one or more another electronic devices connected by network communication with the electronic device 100 to provide the aforementioned information.

According to various exemplary embodiments, the electronic device 100 displays information about an Email including attachment data in a previously transmitted or received Email or predefined Email account. According to one exemplary embodiment, the electronic device 100 provides a region 331 inputting a key word to a certain region of the touch screen 133 displaying one or more Email information including attachment data such that it searches Email information of a database or attachment data. According to one exemplary embodiment, the region 331 inputting the key word displays one or more of an icon 333 capable of releasing the inputted key word, an icon 335 controlling to search by the inputted key word, and an icon 337 controlling to release the display of Email information including displayed attachment data. According to one exemplary embodiment, the electronic device 100 decides and displays (339, 345, 347, 349) one or more of information about attachment data confirmed in the database of the electronic device 100 or information about an Email including the attachment data through the Email attachment control program 116. According to one exemplary embodiment, referring to the displayed Email information 339 in a method of displaying the Email information 339, 345, 347, and 349 including the attachment data, the electronic device 100 displays information included in an Email such as an Email subject (FW: ActiveSync weekly step), a sender (Joseph) in a case of a received Email (or a receiver in a case of a transmitted Email), and attachment data (ActiveSync_Core_report w12), and includes attachment data and one or more among the information. According to one exemplary embodiment, in the method of displaying the Email information including the attachment data, the electronic device 100 is not limited to the Email subject, the sender, the receiver, and the attachment data, and displays one or more of a receiver, an Email reception time, a carbon copy, a blind carbon copy, a link included in the text, and an Email transmission or reception history. According to one exemplary embodiment, each Email displayed on the touch screen 113 displays a check box 341 such that a user selects one or more Emails. According to one exemplary embodiment, in displaying the sender or the receiver in the Email information, when displaying a sender or receiver previously stored in an address book like the Email information 339, 345, or 347, the electronic device 100 displays a name (such as Joseph or Alex) stored in the address book and, when displaying a sender or receiver not stored in the address book, the electronic device 100 displays information (such as Joseph@saint.com) of a sender or receiver included in an Email.

According to various exemplary embodiments, the electronic device 100 senses selecting information about one or more Emails among information about a displayed Email, and corresponds to the selected one or more Email information and include attachment data included in an Email in an Email writing region. According to various exemplary embodiments, when intending to include attachment data (estimate for shipping.xlsx) in the Email writing region, the electronic device 100 selects Email information 347 including attachment data (estimate for shipping.xlsx) information among the displayed Email information.

Referring to FIG. 3D, the electronic device 100 includes attachment data included in an Email corresponding to Email information selected among one or more Email information displayed on the touch screen 133, in an Email writing region. According to one exemplary embodiment, if selecting one Email information 347 among the Email information displayed on the touch screen 133, the electronic device 100 displays (353) attachment data (estimate for shipping.xlsx) included in an Email corresponding to the selected Email information 347, as attachment data included in an Email written in the Email writing region. According to one exemplary embodiment, the attachment data (estimate for shipping.xlsx) displayed in the Email writing region is information including information (such as a stored position) about the attachment data.

When transmitting an Email that is being written, the electronic device 100 transmits one or more attachment data included in an Email writing region together. In transmitting the attachment data (or information about the attachment data), the attachment data is information included in another electronic device (such as a server device). In this case, by transmitting to the other electronic device (such as the server device) information about an Email transmitted to the other electronic device (such as, the server device), the electronic device 100 requests the other electronic device (such as the server device) to transmit attachment data included in information about an Email received in the electronic device 100 or information about the attachment data, to an Email receiver. If the other electronic device (such as the server device) selects the information about the attachment data included in the transmitted Email in providing the attachment data or the information about the attachment data to the Email receiver, the other electronic device (such as the server device) downloads or opens the selected information about the attachment data.

FIGS. 4A, 4B, 4C and 4D illustrate example operations of displaying information associated with attachment data in an electronic device according to this disclosure.

The electronic device 100 classifies Email information included in a database into various categories and provides the classification result, and filters and displays a result satisfying a key word through the key word in each category.

Below, various exemplary embodiments of the present disclosure are described with reference to FIG. 4A.

Referring to FIG. 4A, the electronic device 100 displays in various methods Email information including attachment data among transmitted or received Email information or Email information transmitted or received through a predefined Email account.

According to various exemplary embodiments, when selecting a data attachment icon (such as, 317 of FIG. 3A) in an Email writing region, the electronic device 100 displays (401) a menu for Email information classified into one or more categories.

According to one exemplary embodiment, a method of classifying by category stores in a memory of the electronic device 100 information about an Email received from a counterpart electronic device 220 or server device 230 or transmitted to a counterpart electronic device 220, and constructs a database by classifying information about received one or more Emails by information such as an Email subject, a fine name of an attachment file included in an Email, a sender who sends a received Email, and a receiver who is an object of Email transmission.

Referring to the menu 401 displayed in accordance to one exemplary embodiment, the electronic device 100 classifies Emails including attachment data of the database into categories such as a subject 402, a file name 404, a sender 406, and a receiver 408, and displays names of the classified categories.

Referring to FIG. 4B, when selecting one of the displayed menu 401, the electronic device 100 displays information about an Email corresponding to the selected menu.

According to one exemplary embodiment, when confirming selecting a subject item in the display menu 401, the electronic device 100 displays on the touch screen 133, information about Emails including a subject similar to a subject of an Email that is being written in the database. According to one exemplary embodiment, when inputting a word 'active' to the subject of the Email that is being written and selecting the subject item in a menu selecting and displaying data attachment, the electronic device 100 displays information about an Email having a subject including the 'active' among Emails including attachment data in the database including information about Emails. According to one exemplary embodiment, in displaying Email information corresponding to a selected subject item 403, the electronic device 100 displays a region 405 capable of inputting a subject to be searched such that the electronic device 100 displays on the touch screen 133 information about an Email having a subject including inputted one or more words, and displays in a certain region (such as an Email information display region) an Email including in a subject one or more words inputted to the subject input region 405 and including attachment data. According to one exemplary embodiment, when inputting the 'active' to the region 405 capable of inputting the subject to be searched, the electronic device 100 displays in the Email information display region of the touch screen 133 information about Emails having subjects 'FW: Activesync weekly step' 407 and 'FW: Activesync weekly step' 409 including the 'active' in the subject.

According to various exemplary embodiments, in deciding information about a displayed Email, the electronic device 100 is not limited to deciding an Email attaching independent one or more data as an Email including attachment data and, even when link information is included in the text of an Email or a certain region thereof, the electronic device 100 decides as the Email including the attachment data. According to one exemplary embodiment, when the link information 'www.link.com/' is included in the text of the Email, the electronic device 100 displays Email information by constructing the link information 'www.link-.com/' in a region displaying information about attachment data of the electronic device 100.

Below, various exemplary embodiments of the present disclosure are described with reference to FIG. 4C.

Figure 4C:
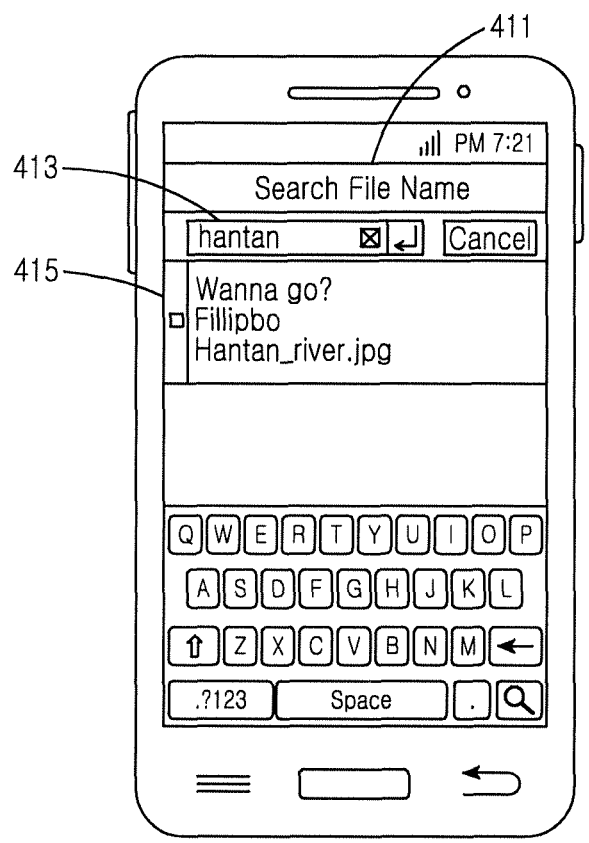

Referring to FIG. 4C, when selecting one in a display menu 401, the electronic device 100 displays information about an Email corresponding to the selected menu.

According to one exemplary embodiment, when confirming selecting a file name item 404 in the displayed menu 401, the electronic device 100 displays on the touch screen 133 a region 411 based on a file name category in a database. The electronic device 100 displays a region 413 capable of inputting a key word for one or more file names, in a certain region of the region 411 based on the file name category. According to one exemplary embodiment, when inputting a key word 'hantan' to the region 413 capable of inputting the key word, the electronic device 100 acquire information about an Email including 'hantan' as an attachment data name, in information about attachment data of the database. The electronic device 100 displays (415) information such as a subject (Wanna go?) of an Email including the 'hantan' as the attachment data name, a sender (Fillipbo), and a file name (Hantan_river.jpg), in an Email information display region of the touch screen 133.

According to various exemplary embodiments, in displaying the file name 'Hantan_river.jpg' acquired from the database by the key word 'hantan', the electronic device 100 displays only information about a file 'Hantan_river.jpg' excepting information about the Email including the file 'Hantan_river.jpg'.

Below, various exemplary embodiments of the present disclosure are described with reference to FIG. 4D.

Figure 4D:
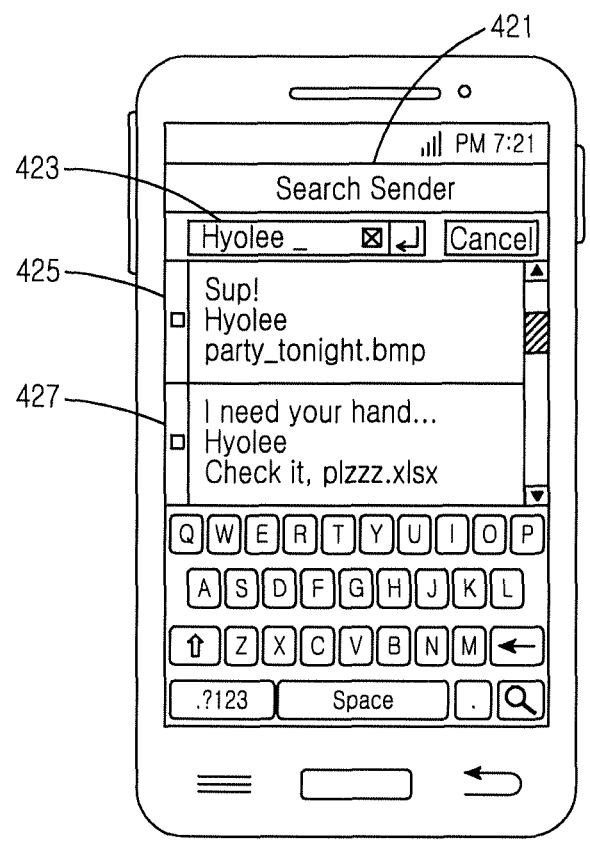

Referring to FIG. 4D, when selecting one in a displayed menu 401, the electronic device 100 displays information about an Email corresponding to the selected menu.

According to one exemplary embodiment, the electronic device 100 confirms selecting the sender item 406 in the displayed menu 401, and displays on the touch screen 133 a region 421 based on a sender category in the database. The electronic device 100 displays a region 423 capable of inputting a key word for one or more senders, in a certain region of the region 421 based on the sender category. According to one exemplary embodiment, when inputting a key word 'Hyolee' to the region 423 capable of inputting the key word, the electronic device 100 acquires information about an Email including the 'Hyolee' as an Email sender in one or more information including attachment data of the database. The electronic device 100 displays information (the content of 425 and 427) about the Email including the 'Hyolee' as the sender name, in an Email information display region of the touch screen 133. Referring to 425 of FIG. 4C, the electronic device 100 displays the key word 'Hyolee' as the sender name in response to the inputted 'Hyolee', and displays subject (Sup!) and attached data (Party_tonight.bmp) information of the acquired Email. Referring to 427 of FIG. 4C, the electronic device 100 displays the key word 'Hyolee' as the sender name in response to the inputted 'Hyolee', and displays subject (I need your hand . . . ) and attached data (Check it, Plzzz.xlsx) information of the acquired Email.

According to various exemplary embodiments, the electronic device 100 confirms selecting a receiver item 408 in the displayed menu 401. According to one exemplary embodiment, the electronic device 100 confirms a receiver of the database through one or more key words inputted to a region capable of inputting the key words. The electronic device 100 acquires information about an Email transmitted to a receiver including inputted one or more words, and displays the acquired information in an Email information display region of a region based on a receiver category.

Below, various exemplary embodiment of the present disclosure are described with reference to FIG. 4E.

Figure 4E:
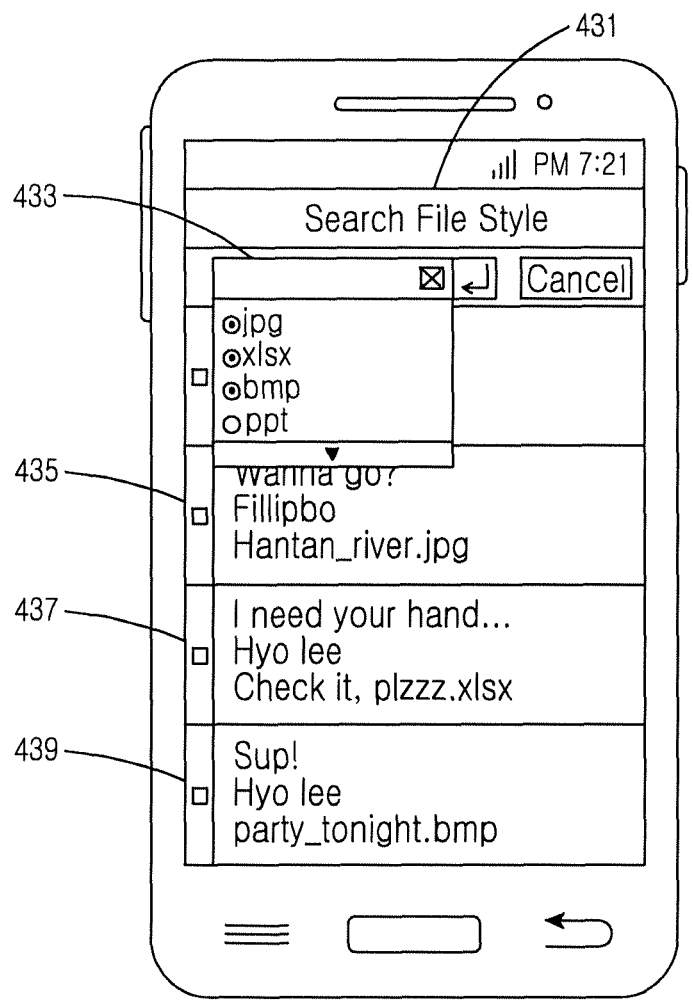

Referring to FIG. 4E, when selecting one in the displayed menu 401, the electronic device 100 displays information about an Email corresponding to the selected menu.

According to one exemplary embodiment, the electronic device 100 confirms selecting a file style item although not being illustrated in the displayed menu 401, and displays on the touch screen 133 a region 431 based on a file style category in the database. The electronic device 100 acquire one or more file styles corresponding to attachment data of the database, and displays the acquired file styles in the region 431 based on the file style category. According to one exemplary embodiment, when selecting file styles 'jpg', 'xlsx', and 'bmp' among the displayed file styles 433, the electronic device 100 acquires information about data having attachment data extensions jpg', 'xlsx', and 'bmp' among one or more information including attachment data of the database. The electronic device 100 displays information about an Email including the acquired data 'Hantan_river.jpg' 435, 'Check it, plzzz.xlsx' 437 and 'party_tonight.bmp' 439 in an Email information display region of the region 431 based on the file style category.

In describing various exemplary embodiments of the present disclosure, the methods described in FIG. 4A to FIG. 4D is provided respectively independently, and one or more methods is combined and provided. According to one exemplary embodiment, in displaying information of an Email including attachment data, the electronic device 100 also displays link information in a region displaying the attachment data.

Figure 5A:
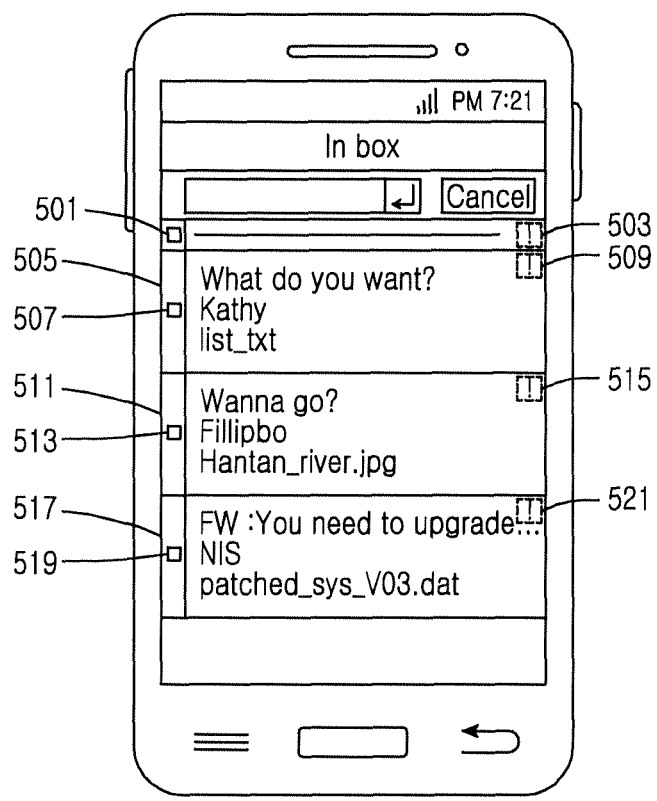

FIGS. 5A, 5B, and 5C illustrate example operation of extending information of an Email in an electronic device according to this disclosure.

Below, various exemplary embodiments of the present disclosure are described with reference to FIG. 5A.

According to various exemplary embodiments, the electronic device 100 includes information about received Emails included in a database of the electronic device 100, in a new category in accordance to a user's input. According to one exemplary embodiment, the electronic device 100 displays information about Emails received in the electronic device 100 or information 505, 511, and 517 about Emails received in one or more predefined Email accounts, in the received Emails. The electronic device 100 provides a function of selecting one or more Email information for the displayed Emails and adding the selected Email information to a new category. According to one exemplary embodiment, the electronic device 100 provides an icon to an Email certain region displayed in a received Email, through a method of adding Email information to a new category (such as favorites). According to one exemplary embodiment, by selecting a favorites addition icon 509, 515, or 521 included in each Email information 505, 511 or 517, the electronic device 100 includes the selected Email information 505, 511 or 517 in a favorites category of the database of the electronic device 100. According to one exemplary embodiment, the electronic device 100 provides one or more check boxes 507, 513 and 519 to the Email information 505, 511 or 517 of the received Email of the electronic device 100, and selects one or more of the check boxes 507, 513 and 519 corresponding to the Emails intended to be moved to the favorites category, and includes information about the selected one or more Emails in the favorites category of the database by selecting the favorites addition icon 503. According to one exemplary embodiment, the electronic device 100 provides a check box (or check box capable of selecting all Emails of an inbox) 501 capable of all selecting the Emails displayed in the received Email of the electronic device 100, and includes one or more Email information corresponding to the selection of the check box 501 in the favorites category of the database of the electronic device 100 by selecting the check box 501 and selecting the favorites addition icon 503.

According to various exemplary embodiments, in including the Email information in the new category (such as favorites), the electronic device 100 is not limited to Email information displayed in a received Email, and provides to include even one or more Email information included in a transmitted Email in the new category (such as favorites).

Below, various exemplary embodiments of the present disclosure are described with reference to FIGS. 5B and 5C.

According to various exemplary embodiments, the electronic device 100 provides attachment data through information about an Email included in a new category (such as favorites) of a database of the electronic device 100.

Referring to FIG. 5B, when selecting a data attachment icon (317 of FIG. 3A) in an Email writing region, the electronic device 100 includes a favorites item 533 in a displayed provision program list 531. According to one exemplary embodiment, the electronic device 100 does not limit a method of displaying the favorites item 523 to displaying in the list 531 and, when selecting an Email item 535 in the displayed list 531, displays the favorites item 523 in a displayed menu 401, and also displays a shortcut icon of the favorites item 523 in an Email writing region.

Referring to FIG. 5C, the electronic device 100 selects the favorites item 533 in an Email writing region through a data attachment function, and displays one or more Email information included in a favorites category of the database of the electronic device 100. According to one exemplary embodiment, the electronic device 100 includes Email information 539 received from 'Kavin' included in the favorites category of the database of the electronic device 100 and having a subject 'FW: bug issue list (emergency)' including data 'bug_list.c' and Email information 545 received from 'NIS' and having a subject 'FW: You need to upgrade your system' including data 'Patched_sys_V03.dat'.

According to various exemplary embodiments, the electronic device 100 sets to release including displayed one or more Email information in a favorites category. According to one exemplary embodiment, the electronic device 100 provides an icon 543 or 549 capable of releasing favorites in a certain region of an Email displayed in the favorites category. According to one exemplary embodiment, by selecting the favorites release icon 543 or 549 included in displayed each Email information 539 or 545, the electronic device 100 removes the selected Email information from the favorites category of the database of the electronic device 100. According to one exemplary embodiment, the electronic device 100 provides a check box 541 or 547 to the Email information included in the favorites category of the electronic device 100, and selects one or more of check boxes corresponding to Emails to be removed from the favorites category, and, by selecting a favorites release icon 553, removes information about the selected one or more Emails from the favorites category of the database. According to one exemplary embodiment, the electronic device 100 provides a check box 551 capable of all selecting the Emails included in the favorites category of the electronic device 100, and, by selecting the check box 551 and selecting the favorites removal icon 553, removes one or more Email information corresponding to the selection of the check box 551 from the favorites category of the database.

FIGS. 6A, 6B, and 6C illustrate example operations of displaying attachment data in an electronic device according to this disclosure.

The electronic device 100 inputs a gesture to Email information displayed on the touch screen 133 and confirms attachment data included in the Email information, and inputs a gesture to the displayed attachment data and confirms Email information including the attachment data.

Below, various exemplary embodiments of the present disclosure are described with reference to FIG. 6A.

Referring to FIG. 6A, to include attachment data in an Email that is being written, the electronic device 100 searches (or filter) Email information associated with the Email that is being written and Email information including data associated with the Email that is being written, and display (601, 603, 605 or 607) the searched Email information in an Email information display region. According to one exemplary embodiment, the electronic device 100 confirms the content of the attachment data included in the Email information through a predefined gesture. According to one exemplary embodiment, the predefined gesture is a selective preliminary motion and, when it is a gesture selecting a touch, the electronic device 100 defines as the selective preliminary motion a gesture such as a gesture after the lapse of a certain time as holding a touch and a gesture of holding an indirect touch through an input means.

Referring to FIG. 6B, when performing a selective preliminary motion for one Email information 605 among Emails displayed in an Email information display region, the electronic device 100 displays (611) the content of attachment data 'Hantan_river.jpg' included in the Email information 605, in a certain region of the touch screen 133. According to one exemplary embodiment, when data is image data, a method of displaying the content of the attachment data 'Hantan_river.jpg' displays a part of the image data, and displays a thumbnail image of the image data. According to one exemplary embodiment, when the attachment data is data constructed in a document form, the electronic device 100 displays a thumbnail image of the first page of the data.

Below, various exemplary embodiments of the present disclosure are described with reference to FIGS. 6B and 6C.

Referring to FIG. 6C, to include attachment data in an Email that is being written, the electronic device 100 searches (or filters) information about the attachment data associated with the Email that is being written and display the searched information in an Email information display region. According to one exemplary embodiment, when the attachment data displayed on the touch screen 133 is data of a document form 621, the electronic device 100 displays a thumbnail image of the first page of the data. According to one exemplary embodiment, when the attachment data displayed on the touch screen 133 is data of an image form, the electronic device 100 displays a part of the image data, and displays a thumbnail image of the image data. According to one exemplary embodiment, the electronic device 100 confirms the content of Email information linked with the attachment data or Email information including the attachment data through a predefined gesture. (1)' According to one exemplary embodiment, the predefined gesture is a selective preliminary motion and, when it is a gesture selecting a touch, the electronic device 100 defines as the selective preliminary motion a gesture such as a gesture after the lapse of a certain time as holding a touch and a gesture of holding an indirect touch through an input means.

Referring to FIG. 6C, when performing a selective preliminary motion for one attachment data information 627 among Emails displayed in an Email information display region, the electronic device 100 displays (631) the content of an Email linked with attachment data or an Email including the attachment data in a certain region of the touch screen 133. According to one exemplary embodiment, a method of displaying Email information linked with attachment data 'ActiveSync_Core_report w10.ppt' 627 and Email information including the attachment data 'ActiveSync_Core_report w10.ppt' 627 is a thumbnail image 631 of a method of displaying the content of an Email transmitted or received in the electronic device 100 on the touch screen 133.

FIGS. 7A, 7B, 7C, 7D, 7E, 7F, 7G, and 7H illustrate example operations of re-attaching attached data in an electronic device according to this disclosure.

According to various exemplary embodiments, the electronic device 100 selects attachment data displayed on the touch screen 133, Email information including the attachment data or Email information linked with the attachment data, and attaches the selected attachment data or attachment data included in a selected Email to an Email that is being written.

Below, various exemplary embodiments of the present disclosure are described with reference to FIGS. 7A, 7B, 7C, and 7D.

Figures 7A, 7B, 7C, 7D:
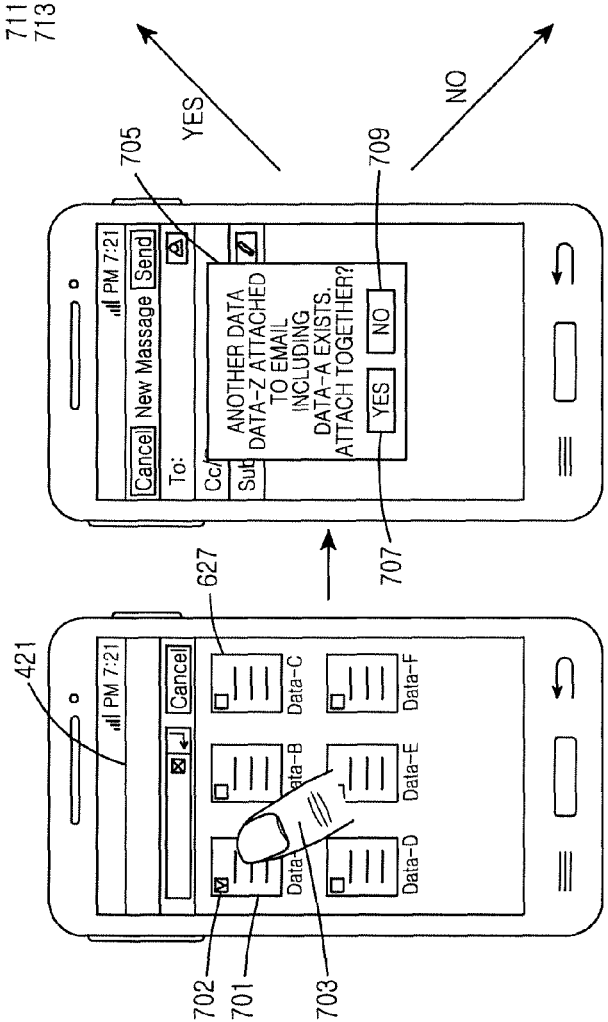

Referring to FIG. 7A, the electronic device 100 displays on the touch screen 133 attachment data information included in a database of the electronic device 100. According to one exemplary embodiment, the attachment data information included in the database is information of attachment data included in an Email transmitted or received by the electronic device 100, and is information of attachment data included in an Email transmitted or received through one or more Email accounts previously stored in the electronic device 100. According to one exemplary embodiment, the electronic device 100 displays on the touch screen 133 one or more attachment data searched (or filtered) in accordance to methods of FIG. 4A to FIG. 4D in association with an Email that is being written. According to one exemplary embodiment, the electronic device 100 displays a check box 702 controlling to select one or more attachment data such that a user selects and attaches a plurality of data among the displayed attachment data. When selecting one or more of the displayed attachment data, the electronic device 100 includes the selected attachment data in the Email that is being written.

Referring to FIG. 7A (*b*), when selecting one of the displayed attachment data, the electronic device 100 confirms Email information including the selected attachment data. When confirming that the Email information including the selected attachment data includes another attachment data, the electronic device 100 displays information about the other attachment data.

According to one exemplary embodiment, the electronic device 100 select (703) to attach 'Data-A' 701, and confirms another data 'Data-Z' in Email information including the 'Data-A' 701, and displays a notification window 705 confirming whether to include the 'Data-Z' as attachment data together.

According to various exemplary embodiments, when including another Email information linked to a transmission or reception history of an Email including the selected 'Data-A' 701 as attachment data or information about the attachment data, the electronic device 100 includes one or more of attachment data included in the linked another Email information or the linked another Email information. According to one exemplary embodiment, the electronic device 100 displays a notification window confirming whether to additionally add attachment data included in the linked another Email information or the linked another Email information.

Referring to FIG. 7C, when confirming selecting 'Yes' 707, the electronic device 100 displays information of 'Data-A' 711 and 'Data-Z' 713 attached to an Email that is being written.

Referring to FIG. 7D, when confirming selecting 'No' 709, the electronic device 100 displays information of 'Data-A' 715 attached to the Email that is being written.

Below, various exemplary embodiments of the present disclosure are described with reference to FIGS. 7E and 7F.

Figure 7E:
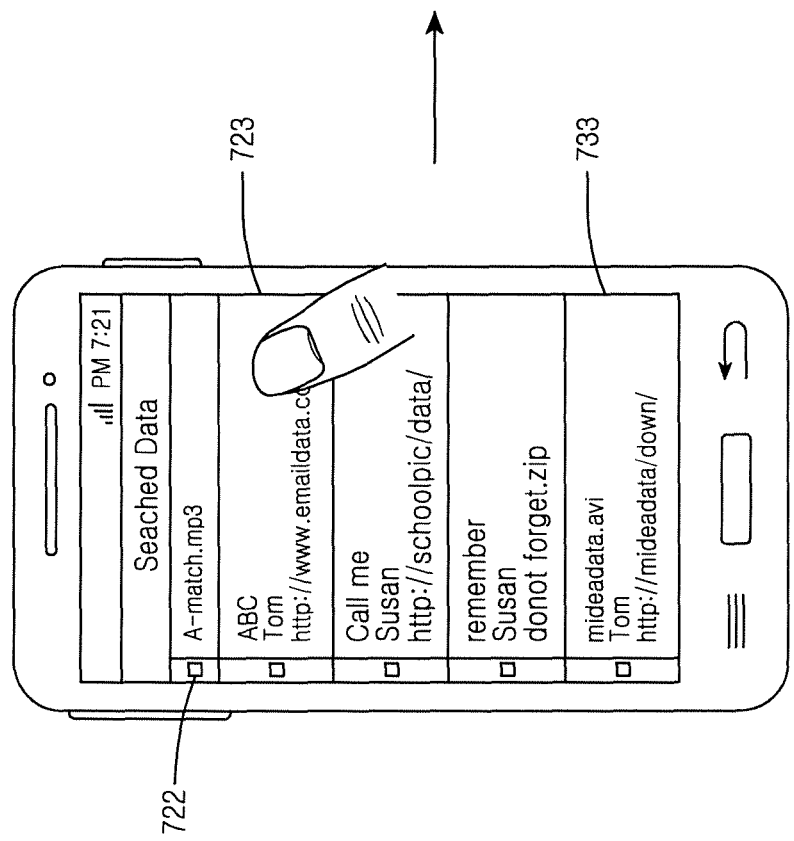

Referring to FIG. 7E, the electronic device 100 displays on the touch screen 133 Email information including attachment data included in a database of the electronic device 100. According to one exemplary embodiment, the Email information including the attachment data included in the database is information about an Email transmitted or received by the electronic device 100, and is information about an Email transmitted or received by one or more Email accounts previously stored in the electronic device 100. According to one exemplary embodiment, the electronic device 100 displays on the touch screen 133 information about one or more Emails searched (or filtered) in accordance to methods of FIG. 4A to FIG. 4D, in association with an Email that is being written. According to one exemplary embodiment, when the searched Email includes link information, the electronic device 100 displays the link information in an attachment data display region. According to one exemplary embodiment, the electronic device 100 displays a check box 722 controlling to select one or more attachment data such that a user selects and attaches a plurality of data in displayed attachment data. When selecting one or more of the displayed attachment data, the electronic device 100 includes the selected attachment data in the Email that is being written.

Figure 7F:
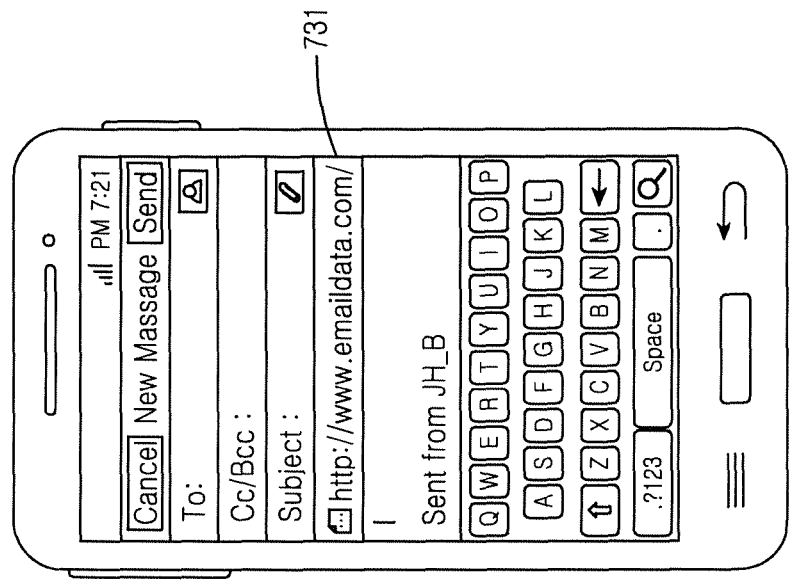

Referring to FIG. 7F, when selecting Email information 723 that includes link information as attachment data, the electronic device 100 attaches the link information that the selected Email information includes as attachment data 731 in an Email region that is being written.

According to various exemplary embodiments, when selecting the Email information 723 that includes the link information as the attachment data, the electronic device 100 also inserts the link information included in the selected Email information 723, as link information to a certain region of the text of an Email region that is being written.

Below, various exemplary embodiments are described with reference to FIGS. 7G and 7H.

Link information attached to an Email transmitted or received by the electronic device 100 is information linked with media data. The electronic device 100 attaches the media data linked with the link information by selecting the link information as attachment data.

Referring to FIG. 7G, the electronic device 100 also includes link information as well as attachment data in a transmitted or received Email. According to one exemplary embodiment, when confirming that an Email includes link information in Email information of a database of the electronic device 100, the electronic device 100 displays the link information in an attachment data display region of an Email information display region displaying Email information 733 including the link information. According to one exemplary embodiment, media data linked with the link information is downloadable media data. According to one exemplary embodiment, data linked with the link information is not limited to the media data, and is downloadable document data, auxiliary data (such as information storage data) linked with one or more programs, and plug-in data.

Referring to FIG. 7H, when selecting (735) the Email information 733 including the link information as the attachment data, the electronic device 100 downloads data linked with the link information included in the selected Email information 733, and attaches the downloaded data as attachment data 731. According to one exemplary embodiment, when confirming the link information, the electronic device 100 downloads data linked with the link information and store the downloaded data in the database and, when selecting Email information 733 including the aforementioned link information, the electronic device 100 attaches previously stored data corresponding to the link information included in the selected Email information 733, as attachment data 731.

Figures 8A, 8B:
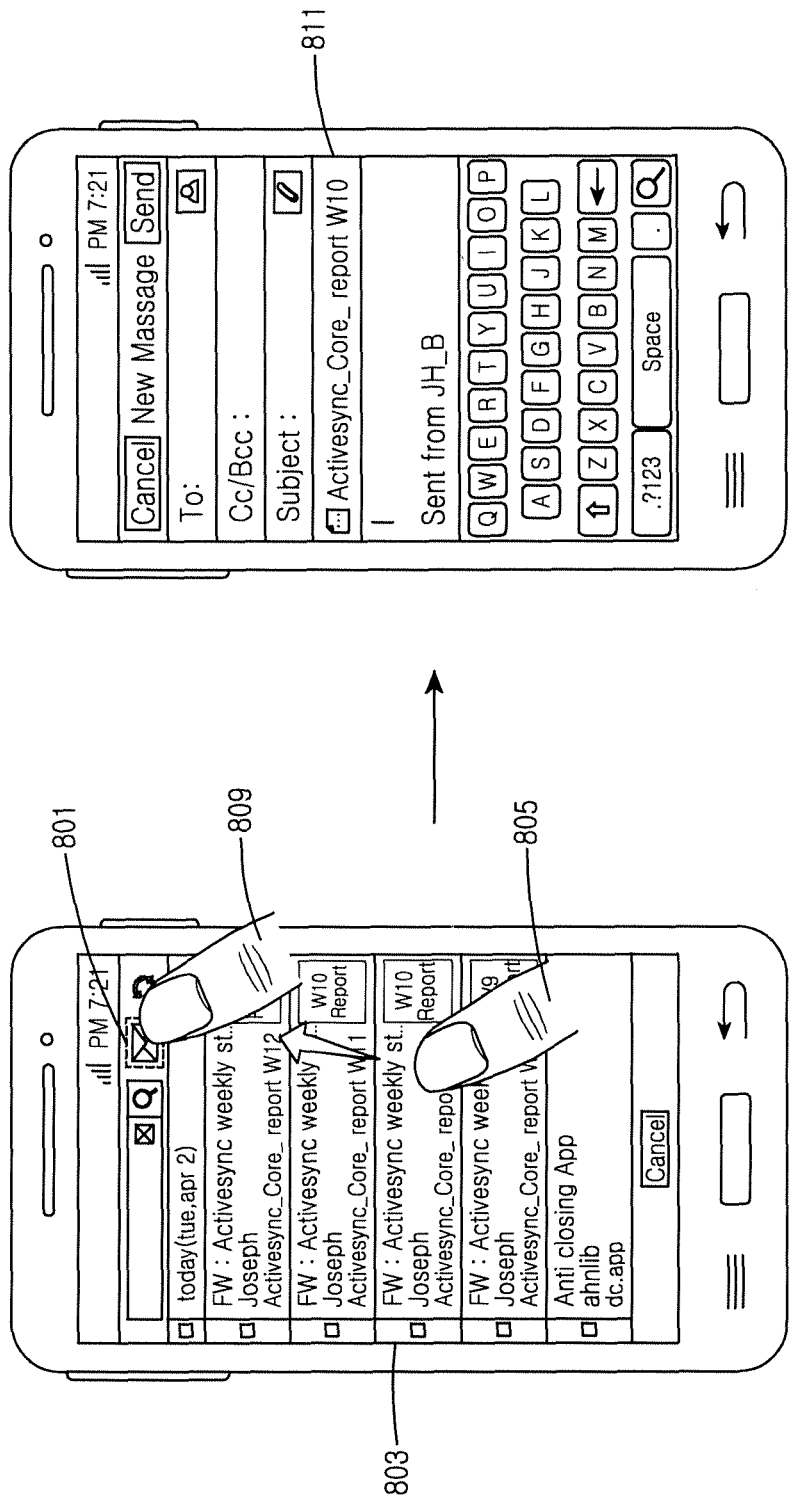
FIGS. 8A and 8B are diagrams illustrating an example operation of attaching attached data to an Email writing region in an electronic device according to this disclosure.

FIGS. 8A and 8B illustrate example operations of attaching attached data to an Email writing region in an electronic device according to this disclosure.

In a method of attaching data to a transmitted Email, the electronic device 100 may not be limited to the aforementioned method of selecting a data attachment menu in an Email region that is being written and selecting and attaching one or more of attachment data associated with an Email that is being written or Email information including the attachment data associated with the Email that is being written.

According to various exemplary embodiments, the electronic device 100 attaches selected data to a newly written Email through a method of selecting one or more Email information in an Email information display region displaying information about a received Email or transmitted Email of the electronic device 100.

Referring to FIG. 8A, the electronic device 100 displays information about a received Email or transmitted Email stored in a database of the electronic device 100, in a displayed Email information display region. According to one exemplary embodiment, the electronic device 100 displays a new Email writing icon 801 in a certain region of the Email information display region.

According to various exemplary embodiments, the electronic device 100 displays information about a received Email or transmitted Email stored in the database, in the displayed Email information display region, and attaches attachment data included in selected one or more Email information, to the transmitted Email. According to one exemplary embodiment, the electronic device 100 selects one Email information 803. The electronic device 100 senses a motion of dragging to the new Email writing icon 801 as holding (805) a touch to the selected Email information 803, and senses a motion of releasing (809) touching to the new Email writing icon 801.

Referring to FIG. 8B, the electronic device 100 displays a new Email writing region on the touch screen 133 by the motion of releasing (809) touching to the new Email writing icon 801, and displays (811) attachment data included in the selected Email information 803 as attachment data attached to a newly written Email.

Figure 9A:
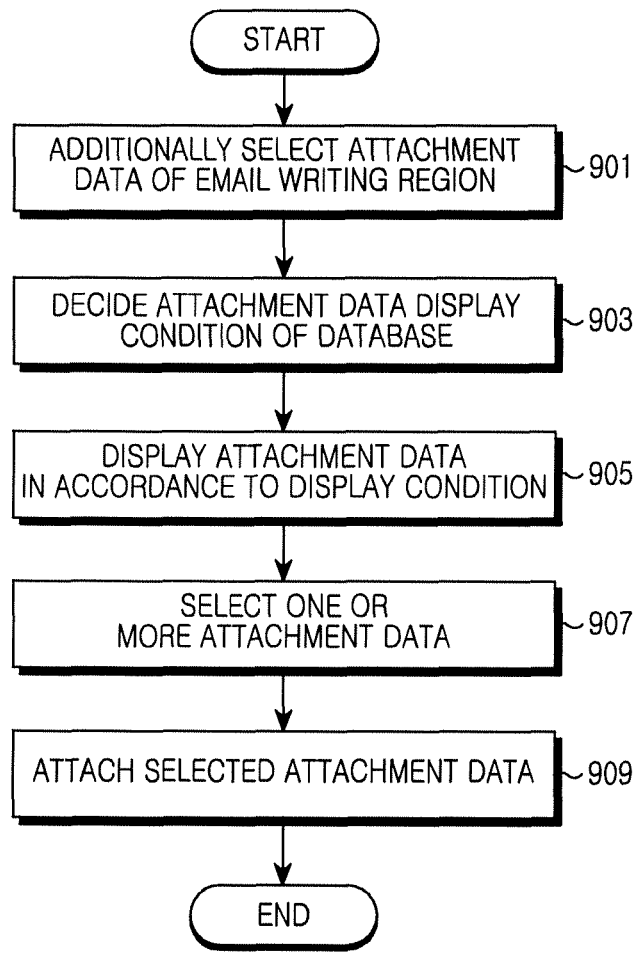
FIGS. 9A and 9B are flowcharts illustrating an example operation of attaching data in an electronic device according to this disclosure.
Figure 9B:
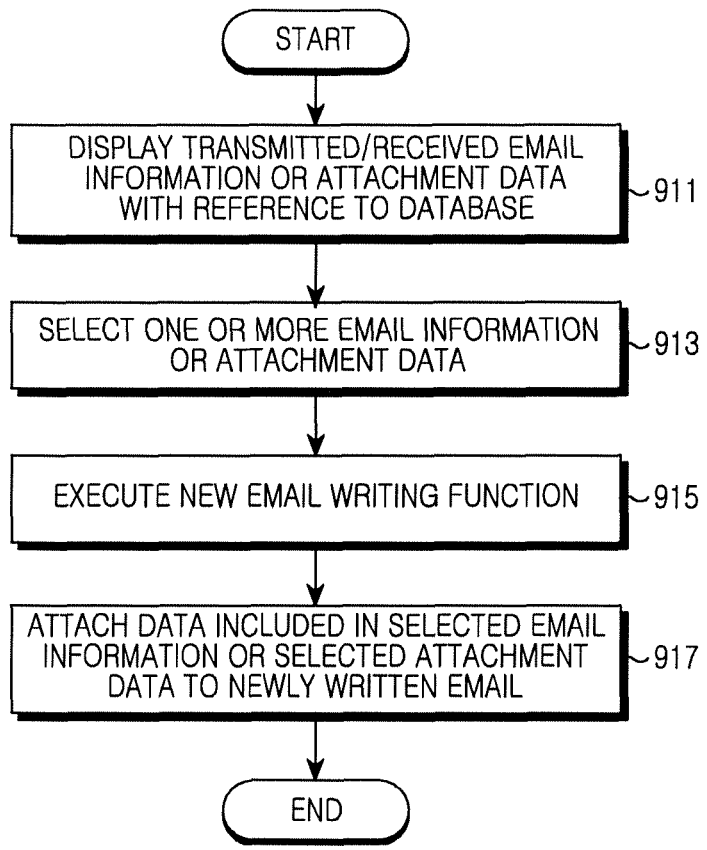

FIGS. 9A and 9B illustrate example operations of attaching data in an electronic device according to this disclosure.

Below, various exemplary embodiments of the present disclosure are described with reference to FIG. 9A.

According to various exemplary embodiments, the electronic device 100 selects a data attachment function of an Email writing region, and selects an attachment data display condition of a database of the electronic device 100, and displays attachment data in accordance to the display condition, and selects one or more attachment data.

In operation 901, the electronic device 100 executes the data attachment function included in the Email writing region. According to one exemplary embodiment, when executing the data attachment function, the electronic device 100 displays attachment data associated with Email information that is being written or the Email information including the attachment data with reference to Email information included in a database of the electronic device 100. According to one exemplary embodiment, in a method of executing the data attachment function, the electronic device 100 provides a method of selecting a data attachment icon displayed in a certain region of the Email writing region. According to one exemplary embodiment, in the method of executing the data attachment function, the electronic device 100 provides a method of executing the data attachment function by a predefined voice input.

In operation 903, the electronic device 100 sets information capable of searching (or filtering) Email information of the database. According to various exemplary embodiments, the electronic device 100 classifies into categories such as an Email subject, a sender of a received Email, a receiver of a transmitted Email, a history of a transmitted or received Email, a data name attached to an Email, link information included in the Email, and a data form attached to the Email. The electronic device 100 selects one or more of the classified categories of the database, and inputs a search condition according to the selected category. According to one exemplary embodiment, the electronic device 100 inputs one or more words to a subject input region of the Email writing region. If sensing the execution of the data attachment function, the electronic device 100 acquires from the database information about an Email including a subject consistent with or similar to one or more words inputted to the subject input region. According to one exemplary embodiment, if executing the data attachment function in the Email writing region, the electronic device 100 displays a menu capable of deciding a method of providing attachment data. In displaying the menu, the electronic device 100 displays the classified category items of the database such as the Email subject, the sender of the received Email, the receiver of the transmitted Email, the history of the transmitted or received Email, the data name attached to the Email, the link information included in the Email, and the data form attached to the Email.

Referring to operation 905, the electronic device 100 displays the Email information classified in accordance to the decided method of providing the attachment data, and displays Email information corresponding to the search condition. According to one exemplary embodiment, in operation 903, the electronic device 100 acquires from the database the attachment data including a subject consistent with or similar to one or more words inputted to the subject input region or Email information including the attachment data, and displays the acquired result in an Email information display region of the touch screen 133. According to one exemplary embodiment, the electronic device 100 displays a menu including one or more items capable of deciding the method of providing the attachment data, and acquires from the database Email information corresponding to the selected item, and displays the acquired Email information corresponding to the item, in the Email information display region of the touch screen 133. According to one exemplary embodiment, in displaying the acquired attachment data or Email information including the attachment data, the electronic device 100 is not limited to displaying in the Email information display region, and uses one or more methods among a method of displaying in a data display way, a method of displaying in a slide way, and a method of outputting by a voice.

According to various exemplary embodiments, the electronic device 100 displays a region capable of inputting a search condition in a partial region of the Email information display region, and changes and searches the search condition in the displayed result by inputting to the region capable of inputting the search condition, and also sets to re-search within the displayed result.

According to various exemplary embodiments, in selecting data attached to an Email that is being written, the electronic device 100 confirms information associated with an object becoming a target of a selective preliminary operation through the selective preliminary operation. According to one exemplary embodiment, if performing the selective preliminary operation for the displayed attachment data, the electronic device 100 displays information about an Email including the attachment data. According to one exemplary embodiment, if performing the selective preliminary operation for the displayed attachment data, the electronic device 100 displays a part or all of the content of the attachment data in a certain region of the touch screen 133. According to one exemplary embodiment, if performing the selective preliminary operation for the displayed Email information, the electronic device 100 displays attachment data included in an Email corresponding to the Email information.

According to operation 907, the electronic device 100 selects one or more of information about displayed attachment data or information about an Email including the attachment data. According to one exemplary embodiment, the electronic device 100 selects information about one or more attachment data or Email information including the attachment data through a check box provided to select one or more in an Email information display region or an attachment data information display region.

According to operation 909, the electronic device 100 attaches the selected one or more attachment data or attachment data included in the selected Email information, to an Email that is being written, and displays information of the attached data in an Email writing region.

According to various exemplary embodiments, the electronic device 100 downloads another data linked with the selected attachment data, and attaches the downloaded data as attachment data. According to one exemplary embodiment, the electronic device 100 includes link information in the selected Email information and also selects the link information as attachment data. If a target linked with the link information is downloadable data, the electronic device 100 downloads the data, and attaches the data as attachment data to the Email that is being written, and displays information of the attached data in the Email writing region.

If performing operation 909, the electronic device 100 terminates an exemplary embodiment of FIG. 9A.

Below, various exemplary embodiments of the present disclosure are described with reference to FIG. 9B.

The electronic device 100 displays information about a transmitted or received Email or information about attachment data with reference to a database of the electronic device 100, and selects one or more Email information or attachment data information, and continuously selects an Email writing function, and attaches attachment data included in the selected Email information or the selected attachment data to an Email, without a separate operation.

Referring to operation 911, the electronic device 100 displays information about a transmitted or received Email and information about attachment data included in the Email information with reference to the database of the electronic device 100. According to one exemplary embodiment, the electronic device 100 displays Email information of a received Email region or transmitted Email region.

Referring to operation 913, the electronic device 100 selects one or more information among the displayed Email information or attachment data information. According to one exemplary embodiment, the electronic device 100 selects one or more information by selecting a check box provided in a certain region of the displayed Email information or the displayed attachment data information.

Referring to operation 915, the electronic device 100 executes a new Email writing function after selecting the one or more Email information or attachment data information. According to one exemplary embodiment, the electronic device 100 senses selecting an icon for executing new Email writing after selecting the one or more information, and provide a new Email writing region. According to one exemplary embodiment, the electronic device 100 senses touching a part of selected one or more information regions after selecting the one or more information, and dragging as holding the touch, and releasing the touch to an icon for executing new Email writing, and provide a new Email writing region. According to one exemplary embodiment, the electronic device 100 also provides to input a voice instruction as an operation of executing new Email writing, after selecting the one or more information.

Referring to operation 917, the electronic device 100 provides the new Email writing region in accordance to operation 915, and attaches attachment data corresponding to the selected information to an Email, and displays the attached attachment data in the new Email writing region. According to one exemplary embodiment, an operation of including the attachment data corresponding to the selected information in an executed newly written Email is an operation of automatically attaching without separate control operation or setting. According to one exemplary embodiment, if an object including link information in the selected one or more information and linked to the link information is downloadable data, the electronic device 100 automatically downloads the data, and attaches the data to an executed newly written Email, and displays information about the attached data in the Email writing region.

If performing operation 917, the electronic device 100 terminates an exemplary embodiment of FIG. 9B.

Figure 10:
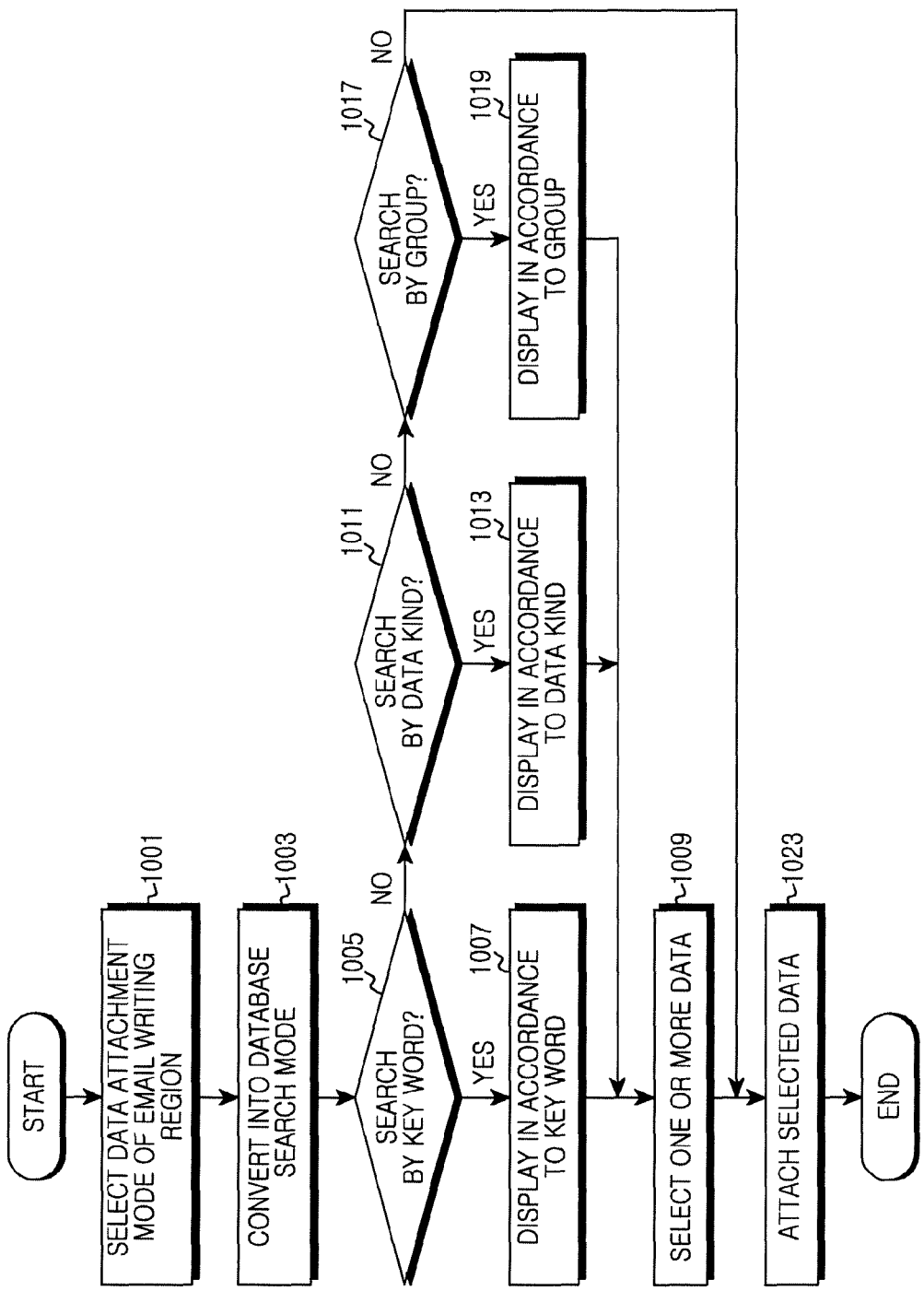
FIG. 10 is a flowchart illustrating an example operation of attaching data in an electronic device according to this disclosure.

FIG. 10 illustrates an operation of attaching data in an electronic device according to various exemplary embodiments of the present disclosure.

According to various exemplary embodiments, the electronic device 100 selects a data attachment mode during Email writing, and performs the data attachment mode as a database search mode, and searches attachment data in a database classified into one or more categories, and selects data, and attaches the selected data to an Email that is being written.

According to operation 1001, the electronic device 100 selects a data attachment mode during Email writing. According to one exemplary embodiment, when executing a data attachment function, the electronic device 100 displays by item attachable data classified in accordance to a defined rule included in the memory 110. According to one exemplary embodiment, the electronic device 100 displays by an item one or more programs included in the memory 110 of the electronic device 100, and the program classifies and provide data usable in the program. According to one exemplary embodiment, the electronic device 100 displays by an item a database constructed based on information about a transmitted or received Email or attachment data attached to the Email, and the database classifies and provide information about an Email transmitted or received by the electronic device 100 or attachment data included in Emails transmitted or received through one or more Email accounts set by the electronic device 100.

According to operation 1003, when selecting a database item, the electronic device 100 classifies the attachment data included in the database, as one or more search conditions. According to one exemplary embodiment, the electronic device 100 provides one or more search conditions such as key word inputting and searching, data kind searching, and category searching.

According to operation 1005, the electronic device 100 senses an operation of inputting a key word in various search conditions provided by the database and searching the database. According to one exemplary embodiment, the electronic device 100 senses an operation of inputting a key word to a key word input region, and performs operation 1007. According to one exemplary embodiment, when sensing an operation of changing the search condition, the electronic device 100 performs operation 1011 or operation 1017.

According to operation 1007, the electronic device 100 searches (or filters) the database based on the inputted key word. According to one exemplary embodiment, the electronic device 100 searches attachment data having the same name as the inputted key word and an Email having the same subject as the inputted key word, and displays the acquired attachment data or Email information. According to one exemplary embodiment, the electronic device 100 searches attachment data having a name including the inputted key word or an Email having a subject including the inputted key word, and displays the acquired attachment data information or Email information.

If performing operation 1007, the electronic device 100 performs operation 1009.

According to operation 1011, the electronic device 100 senses an operation of selecting a data kind (or a data form) as the search condition in various search conditions provided in the database. According to one exemplary embodiment, if sensing the operation of selecting the search condition as the data kind, the electronic device 100 performs operation 1013. According to one exemplary embodiment, when sensing an operation of changing the search condition, the electronic device 100 performs operation 1017.

According to operation 1013, the electronic device 100 searches (or filters) the database based on the data kind. According to one exemplary embodiment, the electronic device 100 uses an extension of data as a method of classifying the data kind (or form). The electronic device 100 classifies attachment data included in the database in accordance to the extension of the data, and displays the classified attachment data.

According to various exemplary embodiments, the electronic device 100 provides a menu capable of confirming by classification of attachment data. According to one exemplary embodiment, when confirming that the attachment data included in the database has an extension of 'bmp', 'xlsx', 'jpg', and 'ppt', the electronic device 100 provides a menu capable of selecting one or more of 'bmp', 'xlsx', 'jpg', and 'ppt', and displays the attachment data included in the one or more selected data kinds.

If performing operation 1013, the electronic device 100 performs operation 1009.

According to operation 1017, the electronic device 100 senses an operation of selecting attachment data classified in accordance to a predefined group (category) as the search condition in various search conditions provided in the database. According to one exemplary embodiment, if sensing an operation of selecting the search condition as a predefined group, the electronic device 100 performs operation 1019. According to one exemplary embodiment, when sensing an operation of changing the search condition, the electronic device 100 again performs operation 1007.

According to operation 1019, the electronic device 100 searches (or filters) the database based on the predefined group. According to one exemplary embodiment, the electronic device 100 uses Email information as a method of classifying a category. According to one exemplary embodiment, the electronic device 100 defines category items by classifying the Email information stored in the database into an Email subject, a sender of a received Email, a receiver of a transmitted Email, a history of a transmitted or received Email, a data name attached to an Email, link information included in the Email, and a data form attached to the Email. The electronic device 100 classifies attachment data included in the database in accordance to a category of data, and displays the classified attachment data by selecting one or more categories.

According to various exemplary embodiments, the electronic device 100 provides a menu capable of confirming by classification of attachment data. According to one exemplary embodiment, when confirming that the attachment data included in the database has an extension of 'bmp', 'xlsx', 'jpg', and 'ppt', the electronic device 100 provides a menu capable of selecting one or more of 'bmp', 'xlsx', 'jpg', and 'ppt', and displays attachment data included in one or more selected data kinds.

If performing operation 1013, the electronic device 100 performs operation 1009.

According to operation 1009, the electronic device 100 selects one or more of the displayed attachment data information or Email information. According to one exemplary embodiment, the electronic device 100 selects one data, or select a plurality of data by selecting a check box provided to a certain region of the displayed Email information or attachment data information.

According to operation 1023, the electronic device 100 attaches attachment data corresponding to the selected attachment data information or attachment data information included in the selected Email information, to an Email that is being written. According to one exemplary embodiment, an operation of attaching the attachment data to the Email is an operation of including information of attachment data stored in the database, in attachment data of the Email. According to one exemplary embodiment, the electronic device 100 attaches the selected one or more attachment data or attachment data included in the selected Email information, to the Email that is being written, and displays information of the attached data in an Email writing region. According to one exemplary embodiment, the electronic device 100 includes link information in the selected Email information and also selects the link information as attachment data. If a target linked with the link information is downloadable data, the electronic device 100 downloads the data, and attaches the data as attachment data to the Email that is being written, and displays information of the attached data in the Email writing region.

If performing operation 1023, the electronic device 100 terminates an exemplary embodiment of FIG. 10.

According to various exemplary embodiments, an operation method of an electronic device includes the operations of entering an attachment mode during first message writing, displaying a list of one or more second messages transmitted or received in the electronic device in association with a first message, selecting one or more third messages among the displayed list of second messages, and attaching information of the selected third message to the first message or displaying the information of the selected third message in a writing region of the first message.

According to various exemplary embodiments, the operation method further includes the operation of transmitting the first message. According to various exemplary embodiments, the second message displays the second message itself or all or a part of information of the second message.

According to various exemplary embodiments, the information of the third message include at least one of a text included in the third message, an image, link information, a file attached to the third image, and link information to a server storing a file attached to the third message. According to one exemplary embodiment, the information of the third message includes at least one of a text included in a fourth message linked with the second message, an image, link information, a file attached to the fourth message and link information to a server storing a file attached to the fourth message.

According to various exemplary embodiments, the messages is messages of one or more of message transmission or reception functions based on an Email, a Short Message Service (SMS) and a Social Networking Service (SNS).

According to various exemplary embodiments, data corresponding to the third message information attached to the first message or displayed in a writing region of the first message is stored in a server interworking with the electronic device. In a case of transmitting the first message, the data stored in the server is attached to the information of the third message or be transmitted attaching link information accessible to the server storing the data to the information of the third message.

According to various exemplary embodiments, the association with the first message is decided by whether the second message includes a subject mapped with a part or all of a subject of the first message or by a message received from a receiver of the first message.

According to various exemplary embodiments, the list include information about the second message composed of one or more of a subject of the second message, a sender, a receiver, a form of a file attached to the second message, link information of the second message content, and an image. According to one exemplary embodiment, the list displays one or more of second message category information associated with the first message.

According to various exemplary embodiments, the category includes one or more of a message subject, a sender of a received message, a receiver of a transmitted message, a history of a transmitted or received message, a data name attached to a message, link information included in a message, and a data form attached to a message.

According to various exemplary embodiments, an operation of attaching the information of the third message attaches the information after downloading.

According to various exemplary embodiments, an operation method of an electronic device includes the operations of selecting information of a first message including attachment information, detecting a gesture of attaching the attachment information of the first message to a second message writing region, and attaching the attachment information to the second message in response to the gesture.

According to various exemplary embodiments, an operation method of an electronic device includes the operations of selecting a first message including link information, detecting a gesture of attaching the link information to a second message, and attaching a data file linked to the link information to the second message in response to the gesture.

An electronic device according to various exemplary embodiments of the present disclosure, for example, uses data of an application attaching a file so as to transmit the file to another electronic device. So, a user simply transmits the file to the other electronic device.

Various exemplary embodiments describing the present disclosure is performed through a module controlling one or more programs included in the memory 110 of the electronic device 100 or one or more devices or programs constructing the electronic device 100, and is also directly controlled by one or more processors.

According to various exemplary embodiments, an electronic device includes a touch screen displaying a first message, a memory storing a part or all of one or more second messages transmitted or received by the electronic device, a message attachment management module for entering an attachment mode during first message writing, displaying a list of one or more second messages transmitted or received in the electronic device in association with a first message, selecting one or more third messages among the displayed list of second messages, and attaching information of the selected third message to the first message or displaying the information of the selected third message in a writing region of the first message, and one or more processors for controlling the message attachment management module.

According to various exemplary embodiments, the message attachment management module transmits the first message. According to one exemplary embodiment, the message attachment management module display in the list the second message itself or all or a part of information of the second message.

According to various exemplary embodiments, the message attachment management module includes in the information of the third message at least one of a text included in the third message, an image, link information, a file attached to the third image, and link information to a server storing a file attached to the third message. According to one exemplary embodiment, the message attachment management module include in the information of the third message at least one of a text included in a fourth message linked with the second message, an image, link information, a file attached to the fourth message and link information to a server storing a file attached to the fourth message.

According to various exemplary embodiments, the message attachment management module processes the messages based on one or more of a message transmission or reception function based on an Email, an SMS and an SNS.

According to various exemplary embodiments, the message attachment management module stores in a server interworking with the electronic device data corresponding to the third message information attached to the first message or displayed in a writing region of the first message. In a case of transmitting the first message, the data is attached to the information of the third message or be transmitted attaching link information accessible to the server storing the data to the information of the third message.

According to various exemplary embodiments, the message attachment management module decides the association with the first message by whether the second message includes a subject mapped with a part or all of a subject of the first message or by a message received from a receiver of the first message.

According to various exemplary embodiments, the message attachment management module includes in the list information about the second message composed of one or more of a subject of the second message, a sender, a receiver, a form of a file attached to the second message, link information of the second message content, and an image. According to one exemplary embodiment, the message attachment management module displays in the list one or more of second message category information associated with the first message. According to various exemplary embodiments, the message attachment management module includes in the category one or more of a message subject, a sender of a received message, a receiver of a transmitted message, a history of a transmitted or received message, a data name attached to a message, link information included in a message, and a data form attached to a message.

According to various exemplary embodiments, in an operation of attaching the information of the third message, the message attachment management module attaches the information after downloading.

According to various exemplary embodiments, an electronic device includes a touch screen displaying a first message, a memory storing a part or all of the first message, a message attachment management module for selecting information of the first message including attachment information, detecting a gesture of attaching the attachment information of the first message to a second message writing region, and attaching the attachment information to the second message in response to the gesture, and one or more processors for controlling the message attachment management module.

According to various exemplary embodiments, an electronic device includes a touch screen displaying a first message, a memory storing a part or all of the first message, a message attachment management module for selecting a first message including link information, detecting a gesture of attaching the link information to a second message, and attaching a data file linked to the link information to the second message in response to the gesture, and one or more processors for controlling the message attachment management module.

Methods according to exemplary embodiments stated in claims or specification of the present disclosure is implemented in a form of hardware, software, or a combination of hardware and software. If the methods are implemented by the software, a computer-readable storage medium storing one or more programs (such as software modules) is provided. The one or more programs stored in the computer-readable storage medium are configured to be executed by one or more processors within an electronic device 100. The one or more programs includes instructions for enabling the electronic device 100 to execute the methods according to the exemplary embodiments stated in the claims or specification of the present disclosure.

According to various exemplary embodiments, a computer-readable recording medium recording a program configured to execute a method for controlling an application using an electronic device comprising the operations of: providing a message application through the electronic device, acquiring a message list comprising information about one or more messages transmitted or received by the electronic device, based on an input configured to transmit a file to an external device for the electronic device through the message application, and attaching to the message application at least a part of message information about the at least one message as the file, based on an input of selecting at least one message among the message list.

These programs (such as software modules or software) is stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Or, the programs are stored in a memory constructed by a combination of some or all of them. Also, each constructed memory is included in plural.

Also, the programs is stored in an attachable storage device accessible to the electronic device 100 through a communication network such as the Internet, an intranet, a Local Area Network (LAN), a Wireless LAN (WLAN) and a Storage Area Network (SAN) or a communication network constructed by a combination of them. This storage device accesses the electronic device 100 through an external port.

Also, a separate storage device on the communication network can access a portable electronic device 100. While the disclosure has been shown and described with reference to certain preferred embodiments thereof, it will be understood by those skilled in the art that various changes in form and details is made therein without departing from the spirit and scope of the disclosure as defined by the appended claims.

What is claimed is:

1. A method for controlling an application using an electronic device, the method comprising:
   providing a message application for generating a message through the electronic device;
   in response to an input for attaching a data to the message application, displaying a message list comprising information about one or more messages transmitted or received by the electronic device, wherein each of the one or more messages include link information to a server storing a file that is linked to the link information;
   in response to an input of selecting at least one message among the message list, attaching, to the message application, link information that is included in the at least one message; and
   transmitting, to an external device, a message with the information that is included in the at least one message.

2. The method of claim 1, further comprising displaying at least part of message information about the at least one message through the message application.

3. The method of claim 1, wherein the at least one message includes the link information as a text of the at least one message.

4. The method of claim 1, wherein the at least one message includes the link information as attachment data.

5. The method of claim 1, wherein the information about one or more messages comprises information comprised of one or more of a subject of the one or more messages, a sender, a receiver, a form of a file attached to the one or more messages, the link information among a content of the one or more messages, an image, or category information of the one or more messages.

6. The method of claim 5, wherein the category information comprises one or more of a message subject, a sender in a case of a received message, a receiver in a case of a transmitted message, a history of a transmitted or received message, a data name attached to a message, the link information comprised in a message, or a form of the data name attached to the message.

7. The method of claim 1, wherein attaching comprises attaching the link information after downloading message information of the at least one message.

8. The method of claim 1, wherein the at least one message further includes a file for an attachment, further comprising:
   in response to the input of selecting the at least one message among the message list, attaching, to the message application, the file for the attachment and the link information which are included in the at least one message; and
   transmitting, to the external device, the message with the file for the attachment and the link information which are included in the at least one message.

9. An electronic device comprising:
   a touch screen; and
   a processor configured to:
      provide a message application for generating a message;
      in response to an input for attaching a data to the message application, control the touch screen to display a message list comprising information about one or more messages transmitted or received by the electronic device, wherein each of the one or more messages include link information to a server storing a file that is linked to the link information;
      in response to an input for selecting at least one message among the message list, attach to the message application,link information that is included in the at least one message; and
      transmit, to an external device, a message with the link information that is included in the at least one message.

10. The electronic device of claim 9, wherein the at least one message further includes a file for an attachment, herein the processor is further configured to:
    in response to selecting the at least one message among the message list, attach, to the message application, the file for the attachment and the link information which are included in the at least one message; and
    transmit, to the external device, the message with the file for the attachment and the link information which are included in the at least one message.

11. The electronic device of claim 9, wherein the processor is further configured to:
    control the touch screen to display a list of at least one file for an attachment included in at least one message which has been transmitted or received by the electronic device;
    in response to selecting a file for an attachment in the list, identify whether a message including the file for the attachment includes another file for an attachment;
    in response to identifying that the message including the file for the attachment includes the another file for the attachment, attach, to the message application, the file for the attachment and the another file for the attachment; and
    transmit, to an external device, a message with the file for the attachment and the another file for the attachment.

12. The electronic device of claim 9, wherein the processor is further configured to control the touch screen to display at least the part of message information about the at least one message through the message application.

13. The electronic device of claim 9, wherein the at least one message includes the link information as a text of the at least one message.

14. The electronic device of claim 9, wherein the at least one message includes the link information as attachment data.

15. The electronic device of claim 9, wherein the information about one or more messages comprises of one or more of a subject of the one or more messages, a sender, a receiver, a form of a file attached to the one or more messages, the link information among a content of the one or more messages, an image, or category information of the one or more messages.

16. The electronic device of claim 15, wherein the category information comprises one or more of a message subject, a sender in a case of a received message, a receiver in a case of a transmitted message, a history of a transmitted or received message, a data name attached to a message, the link information comprised in a message, or a form of the data name attached to the message.

17. The elegy tronrc device of claim 9, wherein the processor is configured to attach the link information after downloading message information.

18. A non-transitory computer-readable recording medium recording a program configured to execute a method for controlling an application using an electronic device comprising operations of:
    providing a message application for generating a message through the electronic device;
    in response to an input for attaching a data to the message application, displaying a message list comprising information about one or more messages transmitted or received by the electronic device, wherein each of the one or more messages include link information to a server storing a file that is linked to the link information;
    in response to an input for selecting at least one message among the message list, attaching, to the message application, link information that is included in the at least one message; and
    transmitting, to an externalevice, a message with the link information that is included in at least one message.

19. The method of claim 1, further comprising:
    displaying a list of at least one file for an attachment included in at least one message which has been transmitted or received by the electronic device;
    in response to selecting a file for an attachment in the list, identifying whether a message including the file for the attachment includes another file for an attachment;
    in response to identifying that the message including the file for the attachment includes the another file for the attachment, attaching, to the message application, the file for the attachment and the another file for the attachment; and
    transmitting, to an external device, a message with the file for the attachment and the another file for the attachment.

* * * * *